US012770547B2

(12) United States Patent
Feng et al.

(10) Patent No.: US 12,770,547 B2
(45) Date of Patent: Oct. 20, 2026

(54) GATE DRIVING CIRCUIT, DISPLAY PANEL AND DISPLAY APPARATUS

(71) Applicants: Hefei BOE Joint Technology Co., Ltd., Hefei (CN); BOE Technology Group Co., Ltd., Beijing (CN); Beijing BOE Technology Development Co., Ltd., Beijing (CN)

(72) Inventors: Xuehuan Feng, Beijing (CN); Yongqian Li, Beijing (CN)

(73) Assignees: Hefei BOE Joint Technology Co., Ltd., Hefei (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 19/149,518

(22) PCT Filed: Aug. 16, 2024

(86) PCT No.: PCT/CN2024/112815
§ 371 (c)(1),
(2) Date: Jul. 18, 2025

(87) PCT Pub. No.: WO2025/112671
PCT Pub. Date: Jun. 5, 2025

(65) Prior Publication Data
US 2026/0229161 A1 Aug. 6, 2026

(30) Foreign Application Priority Data
Nov. 29, 2023 (CN) ........................ 202311615862.0

(51) Int. Cl.
*G09G 3/20* (2006.01)

(52) U.S. Cl.
CPC ... *G09G 3/2096* (2013.01); *G09G 2300/0408* (2013.01); *G09G 2300/0413* (2013.01);
(Continued)

(58) Field of Classification Search
CPC ......... G09G 3/2096; G09G 2300/0408; G09G 2300/0413; G09G 2310/0267;
(Continued)

(56) References Cited

U.S. PATENT DOCUMENTS

2019/0066617 A1* 2/2019 Zhao .................... G11C 19/287
2021/0193001 A1* 6/2021 Feng ........................ G09G 3/20

FOREIGN PATENT DOCUMENTS

CN 103632641 A 3/2014
CN 105719593 A 6/2016
(Continued)

*Primary Examiner* — Michael A Faragalla
(74) *Attorney, Agent, or Firm* — IPro, PLLC

(57) ABSTRACT

A gate driving circuit, a display panel and a display apparatus are disclosed. The gate driving circuit includes: a shift register unit and a level control unit. The shift register unit includes a scan shift register and a dummy shift register; and the level control unit is electrically connected to a first scan input signal line and a second scan input signal line of the scan shift register and the dummy shift register respectively, and is configured to be driven by different control signals to input different signals to the first scan input signal line and the second scan input signal line.

20 Claims, 13 Drawing Sheets

(52) U.S. Cl.
CPC ............... *G09G 2310/0267* (2013.01); *G09G 2310/0283* (2013.01); *G09G 2310/0286* (2013.01); *G09G 2310/06* (2013.01)

(58) Field of Classification Search
CPC ... G09G 2310/0283; G09G 2310/0286; G09G 2310/06; G09G 3/20; G09G 3/36; G11C 19/28
See application file for complete search history.

(56) References Cited

FOREIGN PATENT DOCUMENTS

| | | |
|---|---|---|
| CN | 110189724 A | 8/2019 |
| CN | 221573465 U | 8/2024 |

* cited by examiner

GATE DRIVING CIRCUIT, DISPLAY PANEL AND DISPLAY APPARATUS

CROSS-REFERENCE TO RELATED APPLICATIONS

This application is a National Stage of International Application No. PCT/CN2024/112815, filed on Aug. 16, 2024, which claims priority to Chinese Patent Application No. 202311615862.0, filed with the China National Intellectual Property Administration on Nov. 29, 2023, and entitled “Gate Driving Circuit, Display Panel and Display Apparatus”, the content of which is hereby incorporated by reference in its entirety.

TECHNICAL FIELD

The present disclosure relates to the technical field of display, and in particular to a gate driving circuit, a display panel and a display apparatus.

BACKGROUND

In the field of display technology, a gate driving circuit is often used to provide scan signals for a display panel instead of a gate management chip IC, to reduce the cost of the circuit. In addition, in order to solve the problem of display turnover of the display panel in the display process, the gate driving circuit generally adopts a bidirectional scanning mode. The gate driver circuit generally includes three shift registers of a dummy shift register 1 (dummy Gate driver On Array, dummy GOA1), a scan shift register (Normal Gate driver On Array, Normal GOA) and a dummy shift register 2 (dummy Gate driver On Array, dummy GOA2). Specific circuits are shown in FIG. 1, FIG. 2 and FIG. 3. The structure of the shift register in the gate driving circuit is relatively complex. Thus, the cost of the display panel is high, and the yield of the panel is poor.

SUMMARY

Embodiments of the present disclosure provide a gate driving circuit, a display panel and a display apparatus, for performing frame reset processing on a scan shift register and a dummy shift register in combination with different conduction conditions of a level control unit, to reduce the number of transistors in the gate driving circuit, save costs, and improve the yield of the panel.

Specific technical schemes according to embodiments of the present disclosure are as follows.

In a first aspect, embodiments of the present disclosure provide a gate driving circuit, including: a shift register unit and a level control unit;

where the shift register unit includes a scan shift register and a dummy shift register, the scan shift register is electrically connected with a gate line, and is configured to input a scan drive signal to the gate line according to a signal of a first scan input signal line and a signal of a second scan input signal line, the dummy shift register is electrically connected with the scan shift register, and is configured to input a cascade drive signal to the scan shift register according to the signal of the first scan input signal line and the signal of the second scan input signal line;

the level control unit is electrically connected with the first scan input signal line and the second scan input signal line of the scan shift register and the dummy shift register respectively, and is configured to write a first scan control signal into the first scan input signal line of the scan shift register and the dummy shift register and write a second scan control signal into the second scan input signal line of the scan shift register and the dummy shift register in response to a first control signal, write the second scan control signal into the first scan input signal line and the second scan input signal line of the scan shift register and the dummy shift register in response to a second control signal, and write the first scan control signal into the first scan input signal line and the second scan input signal line of the scan shift register and the dummy shift register in response to a third control signal.

Optionally, the level control unit includes a first control subunit, a second control subunit and a third control subunit;

a control end of the first control subunit is electrically connected with a first control signal line, a first end of the first control subunit is electrically connected with a first transmission line, and a second end of the first control subunit is electrically connected with a second transmission line;

the first control subunit is configured to conduct the first transmission line and the second transmission line in response to an active-level signal of the first control signal line;

a control end of the second control subunit is electrically connected with a second control signal line, a first end of the second control subunit is electrically connected with the first transmission line, and a second end of the second control subunit is electrically connected with a first scan control signal line;

the second control subunit is configured to write the first scan control signal into the first transmission line in response to an active-level signal of the second control signal line;

a control end of the third control subunit is electrically connected with a third control signal line, a first end of the third control subunit is electrically connected with the second transmission line, and a second end of the third control subunit is electrically connected with a second scan control signal line;

the third control subunit is configured to write the second scan control signal into the second transmission line in response to an active-level signal of the third control signal line.

Optionally, the first scan input signal line of the scan shift register and the dummy shift register is electrically connected with the first transmission line, and the second scan input signal line of the scan shift register and the dummy shift register is electrically connected with the second transmission line;

the first control signal causes the first control signal line to provide an inactive-level signal, the second control signal line to provide an active-level signal, and the third control signal line to provide an active-level signal;

the second control signal causes the first control signal line to provide an active-level signal, the second control signal line to provide an inactive-level signal, and the third control signal line to provide an active-level signal;

the third control signal causes the first control signal line to provide an active-level signal, the second control signal line to provide an active-level signal, and the third control signal line to provide an inactive-level signal.

Optionally, the first control subunit includes: a first transistor, a control end of the first transistor is electrically connected with the first control signal line, a first end of the first transistor is electrically connected with the first transmission line, and a second end of the first transistor is electrically connected with the second transmission line.

Optionally, the second control subunit includes: a second transistor, a control end of the second transistor is electrically connected with the second control signal line, a first end of the second transistor is electrically connected with the first scan control signal line, and a second end of the second transistor is electrically connected with the first transmission line.

Optionally, the third control subunit includes: a third transistor, a control end of the third transistor is electrically connected with the third control signal line, a first end of the third transistor is electrically connected with the second transmission line, and a second end of the third transistor is electrically connected with the second scan control signal line.

Optionally, the shift register unit includes a plurality of scan shift registers, and the plurality of scan shift registers are arranged in cascade;

- the dummy shift register includes a first dummy shift register, a first input signal line of the first dummy shift register is electrically connected with a frame start signal line, a second input signal line of the first dummy shift register is electrically connected with a cascade signal output end of a first-level scan shift register of the plurality of scan shift registers, and a cascade output signal line of the first dummy shift register is electrically connected with a first input signal line of the first-level scan shift register.

Optionally, the shift register unit includes a plurality of scan shift registers, and the plurality of scan shift registers are arranged in cascade;

- the dummy shift register includes a second dummy shift register, a first input signal line of the second dummy shift register is connected with a cascade signal output end of a last-level scan shift register of the plurality of scan shift registers, a second input signal line of the second dummy shift register is electrically connected with a frame start signal line, and a cascade output signal line of the second dummy shift register is electrically connected with a second input signal line of the last-level scan shift register.

Optionally, the scan shift register includes:

- a first input module, configured to provide the signal of the first scan input signal line to a pull-up node in response to a signal of a first input signal line;
- a second input module, configured to provide the signal of the second scan input signal line to the pull-up node in response to a signal of a second input signal line;
- a first node control module, configured to control a signal of the pull-up node and a signal of a pull-down node;
- a first cascade output module, configured to provide a signal of a cascade clock signal line to a cascade signal output end in response to the signal of the pull-up node; or provide a signal of a first reference signal line to the cascade signal output end in response to the signal of the pull-down node;
- a first drive output module, configured to provide a signal of a clock signal line to a drive output end in response to the signal of the pull-up node; or provide a signal of a second reference signal line to the drive output end in response to the signal of the pull-down node.

Optionally, the first input module includes: a fourth transistor;

- a control end of the fourth transistor is electrically connected with the first input signal line, a first end of the fourth transistor is electrically connected with the first scan input signal line, and a second end of the fourth transistor is electrically connected with the pull-up node.

Optionally, the second input module includes: a fifth transistor;

- a control end of the fifth transistor is electrically connected with the second input signal line, a first end of the fifth transistor is electrically connected with the pull-up node, and a second end of the fifth transistor is electrically connected with the second scan input signal line.

Optionally, the scan shift register further includes: a frame reset module, where the frame reset module is electrically connected with the pull-up node;

- the frame reset module is configured to provide a signal of a first reference signal line to the pull-up node in response to a signal of the frame start signal line.

Optionally, the frame reset module includes: a sixth transistor;

- a control end of the sixth transistor is electrically connected with the frame start signal line, a first end of the sixth transistor is electrically connected with the pull-up node, and a second end of the sixth transistor is electrically connected with the first reference signal line.

Optionally, the dummy shift register includes:

- a third input module, configured to provide the signal of the first scan input signal line to a pull-up node in response to a signal of a first input signal line;
- a fourth input module, configured to provide the signal of the second scan input signal line to the pull-up node in response to a signal of a second input signal line;
- a second node control module, configured to control a signal of the pull-up node and a signal of a pull-down node;
- a second cascade output module, configured to provide a signal of a cascade clock signal line to a cascade output signal line in response to the signal of the pull-up node; or provide a signal of a first reference signal line to the cascade output signal line in response to the signal of the pull-down node;
- a second drive output module, configured to provide a signal of a clock signal line to a drive output end in response to the signal of the pull-up node; or provide a signal of a second reference signal line to the drive output end in response to the signal of the pull-down node.

Optionally, the third input module includes: a seventh transistor;

- a control end of the seventh transistor is electrically connected with the first input signal line, a first end of the seventh transistor is electrically connected with the first scan input signal line, and a second end of the seventh transistor is electrically connected with the pull-up node.

Optionally, the fourth input module includes: an eighth transistor;

- a control end of the eighth transistor is electrically connected with the second input signal line, a first end of the eighth transistor is electrically connected with the pull-up node, and a second end of the eighth transistor is electrically connected with the second scan input signal line.

Optionally, the scan shift register further includes a compensation module, where the compensation module is electrically connected with the pull-up node;

the compensation module is configured to provide a high-level compensation signal to the pull-up node in response to a signal of a compensation signal line.

Optionally, the compensation module includes a twenty-seventh transistor, a twenty-eighth transistor, a twenty-ninth transistor and a fourth capacitor;

a control end of the twenty-seventh transistor is electrically connected with the compensation signal line, a first end of the twenty-seventh transistor is electrically connected with the cascade signal output end, and a second end of the twenty-seventh transistor is electrically connected with a control end of the twenty-eighth transistor;

a first end of the twenty-eighth transistor is electrically connected with a compensation clock signal line, and a second end of the twenty-eighth transistor is electrically connected with a first end of the twenty-ninth transistor;

a control end of the twenty-ninth transistor is electrically connected with the compensation clock signal line, and a second end of the twenty-ninth transistor is electrically connected with the pull-up node;

a first end of the fourth capacitor is electrically connected with the control end of the twenty-eighth transistor, and a second end of the fourth capacitor is electrically connected with the first reference signal line.

Optionally, the scan shift register further includes an auxiliary compensation module, where the auxiliary compensation module includes a thirtieth transistor and a thirty-first transistor;

a control end of the thirtieth transistor is electrically connected with the compensation clock signal line, a first end of the thirtieth transistor is electrically connected with the pull-down node, and a second end of the thirtieth transistor is electrically connected with a first end of the thirty-first transistor;

a control end of the thirty-first transistor is electrically connected with the control end of the twenty-eighth transistor, and a second end of the thirty-first transistor is electrically connected with the first reference signal line.

In a second aspect, embodiments of the present disclosure further provide a display panel, including: a plurality of gate lines and the above gate driving circuit;

where a drive output end of one scan shift register in the gate driving circuit is electrically connected with one gate line of the plurality of gate lines.

In a third aspect, embodiments of the present disclosure further provide a display apparatus including the above display panel.

In a fourth aspect, embodiments of the present disclosure further provide a method for driving the above gate driving circuit, including:

in a scan stage, the level control unit writing the first scan control signal into the first scan input signal line and writing the second scan control signal into the second scan input signal line in response to the first control signal, the scan shift register inputting the scan drive signal to the gate line in response to the signal of the first scan input signal line and the signal of the second scan input signal line, and the dummy shift register inputting the cascade drive signal to the scan shift register in response to the signal of the first scan input signal line and the signal of the second scan input signal line;

in a frame reset stage, the scan shift register resetting a pull-up node of the scan shift register in response to a frame start signal line, and the dummy shift register resetting a pull-up node of the dummy shift register through the signal of the first scan input signal line and/or the signal of the second scan input signal line in response to a signal of a frame start signal line; wherein the level control unit writes the second scan control signal into the first scan input signal line and the second scan input signal line of the scan shift register and the dummy shift register in response to the second control signal, or writes the first scan control signal into the first scan input signal line and the second scan input signal line of the scan shift register and the dummy shift register in response to the third control signal.

Beneficial effects of the present disclosure are as follows.

In summary, embodiments of the present disclosure provide a gate driving circuit, a display panel and a display apparatus. The gate driving circuit includes: a shift register unit and a level control unit, the shift register unit includes a scan shift register and a dummy shift register, the scan shift register is electrically connected with a gate line, and is configured to input a scan drive signal to the gate line according to a signal of a first scan input signal line and a signal of a second scan input signal line, the dummy shift register is electrically connected with the scan shift register, and is configured to input a cascade drive signal to the scan shift register according to the signal of the first scan input signal line and the signal of the second scan input signal line, the level control unit is electrically connected with the first scan input signal line and the second scan input signal line of the scan shift register and the dummy shift register respectively, and is configured to write a first scan control signal into the first scan input signal line of the scan shift register and the dummy shift register and write a second scan control signal into the second scan input signal line of the scan shift register and the dummy shift register in response to a first control signal, write the second scan control signal into the first scan input signal line and the second scan input signal line of the scan shift register and the dummy shift register in response to a second control signal, and write the first scan control signal into the first scan input signal line and the second scan input signal line of the scan shift register and the dummy shift register in response to a third control signal. After transistors for frame reset in the scan shift register and the dummy shift register are removed, frame reset processing is performed on the scan shift register and the dummy shift register in combination with different conduction conditions of the level control unit, to reduce the number of transistors in the gate driving circuit, save the cost and improve the yield of the panel.

Other features and advantages of the present disclosure will be described in the following description, and in part will become apparent from the description, or may be learned through implementation of the present disclosure. The purpose and other advantages of the present disclosure can be achieved and obtained through structures indicated in the written description, claims, and drawings.

BRIEF DESCRIPTION OF FIGURES

The accompanying drawings, which are described herein to provide a further understanding of the present disclosure, are incorporated in and constitute a part of the present disclosure. Illustrative embodiments of the present disclosure and the description thereof are intended to be illustrative of the present disclosure and are not intended to be unduly limiting of the present disclosure.

DETAILED DESCRIPTION

For making objectives, technical solutions and advantages of embodiments of the present disclosure clearer, technical solutions of embodiments of the present disclosure will be clearly and completely described below in combination with accompanying drawings in embodiments of the present disclosure. Apparently, embodiments described are some rather than all of embodiments of the present disclosure. Based on embodiments of the present disclosure, all other embodiments obtained by those of ordinary skill in the art without making creative efforts fall within the scope of protection of the present disclosure.

The terms "first," "second," and the like in the description and claims of the present disclosure as well as in the foregoing drawings are used to distinguish similar objects, and not necessarily for describing a particular order or sequence. It should be understood that the data so used may be interchanged where appropriate, so that embodiments of the present disclosure described herein can be implemented using orders other than those illustrated or described herein.

Embodiments of the present disclosure are described in detail below referring to accompanying drawings.

Figure 1:
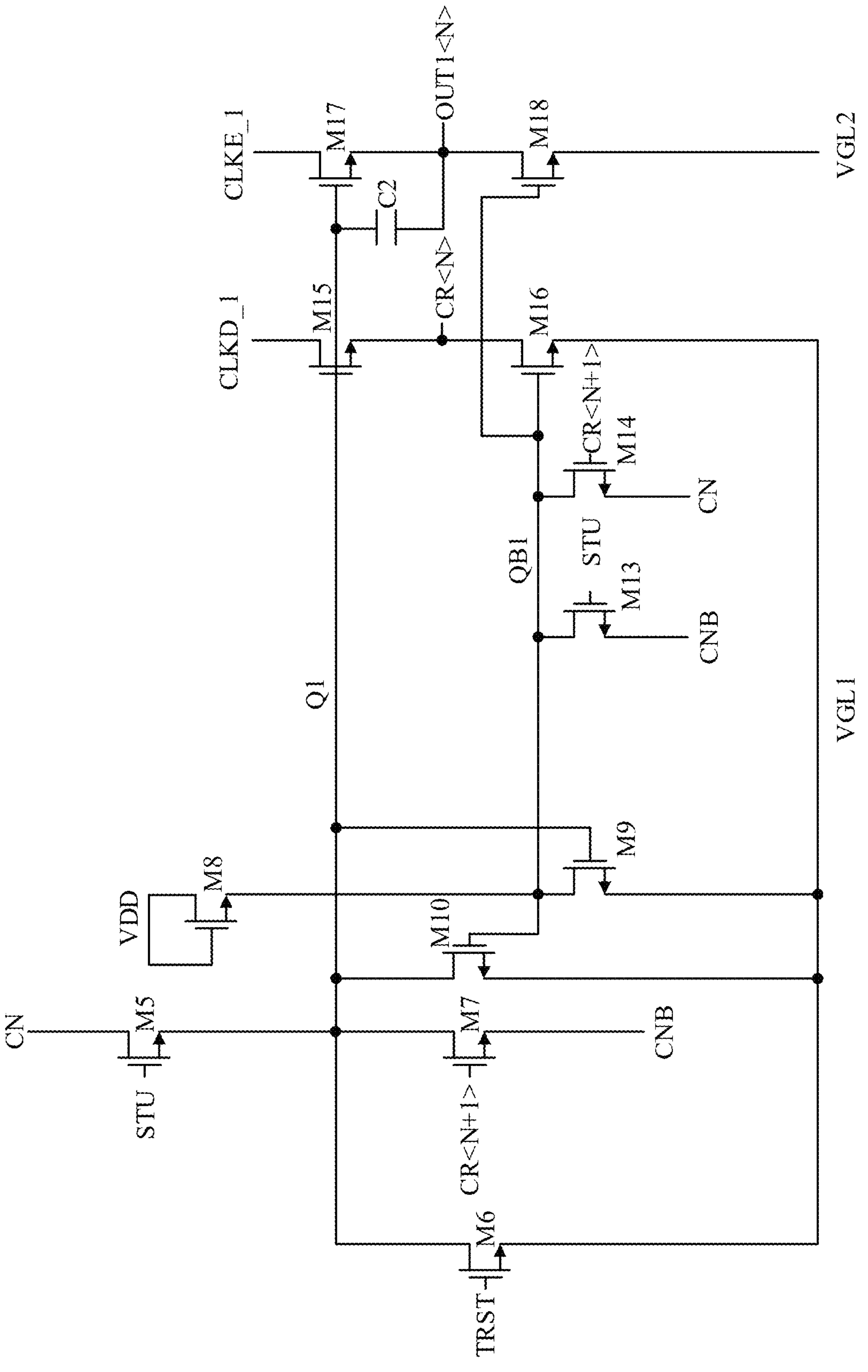
FIG. 1 is a schematic diagram of a dummy GOA1 in related art.
Figure 2:
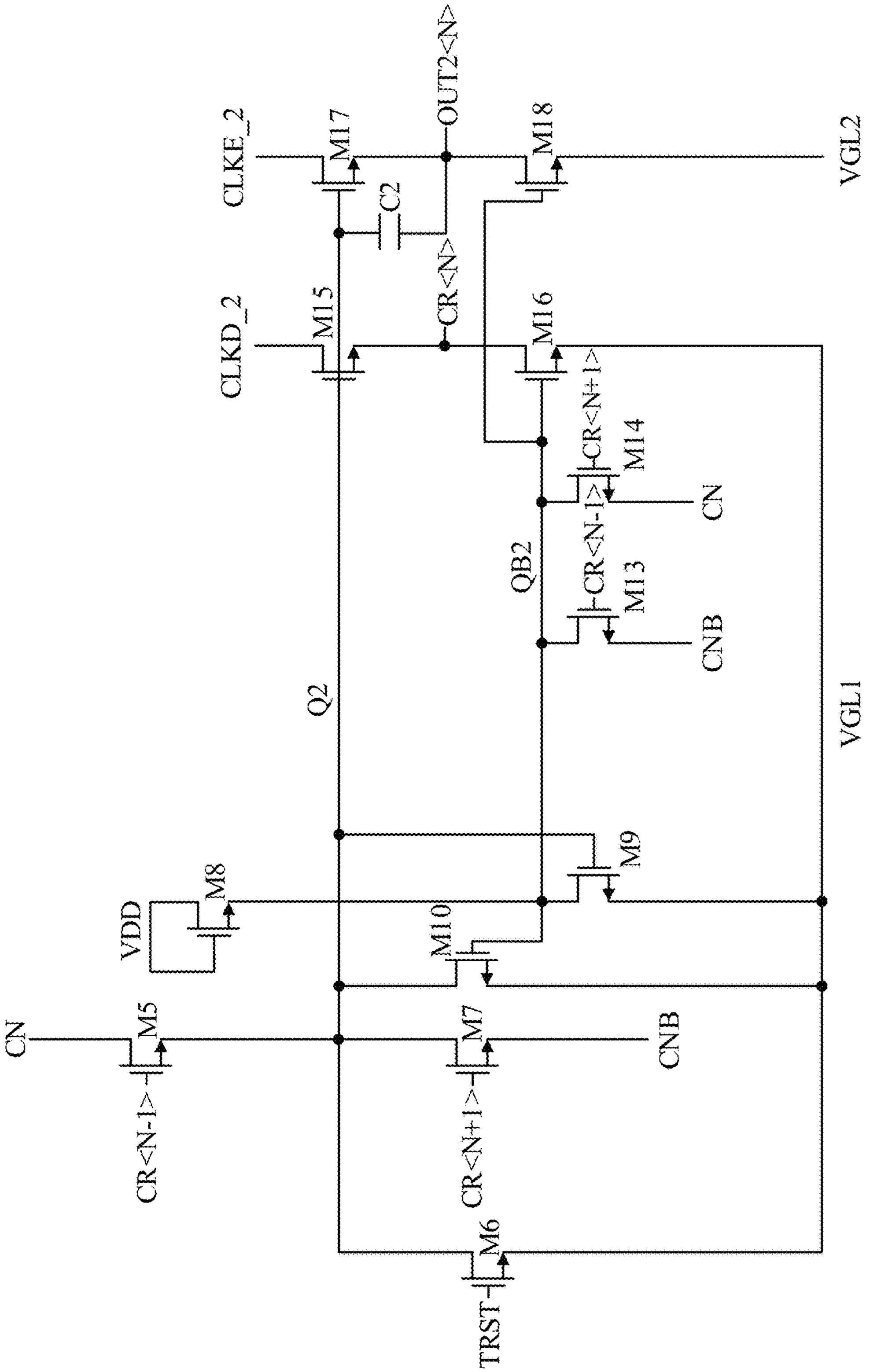
FIG. 2 is a schematic diagram of a Normal GOA in related art.
Figure 3:
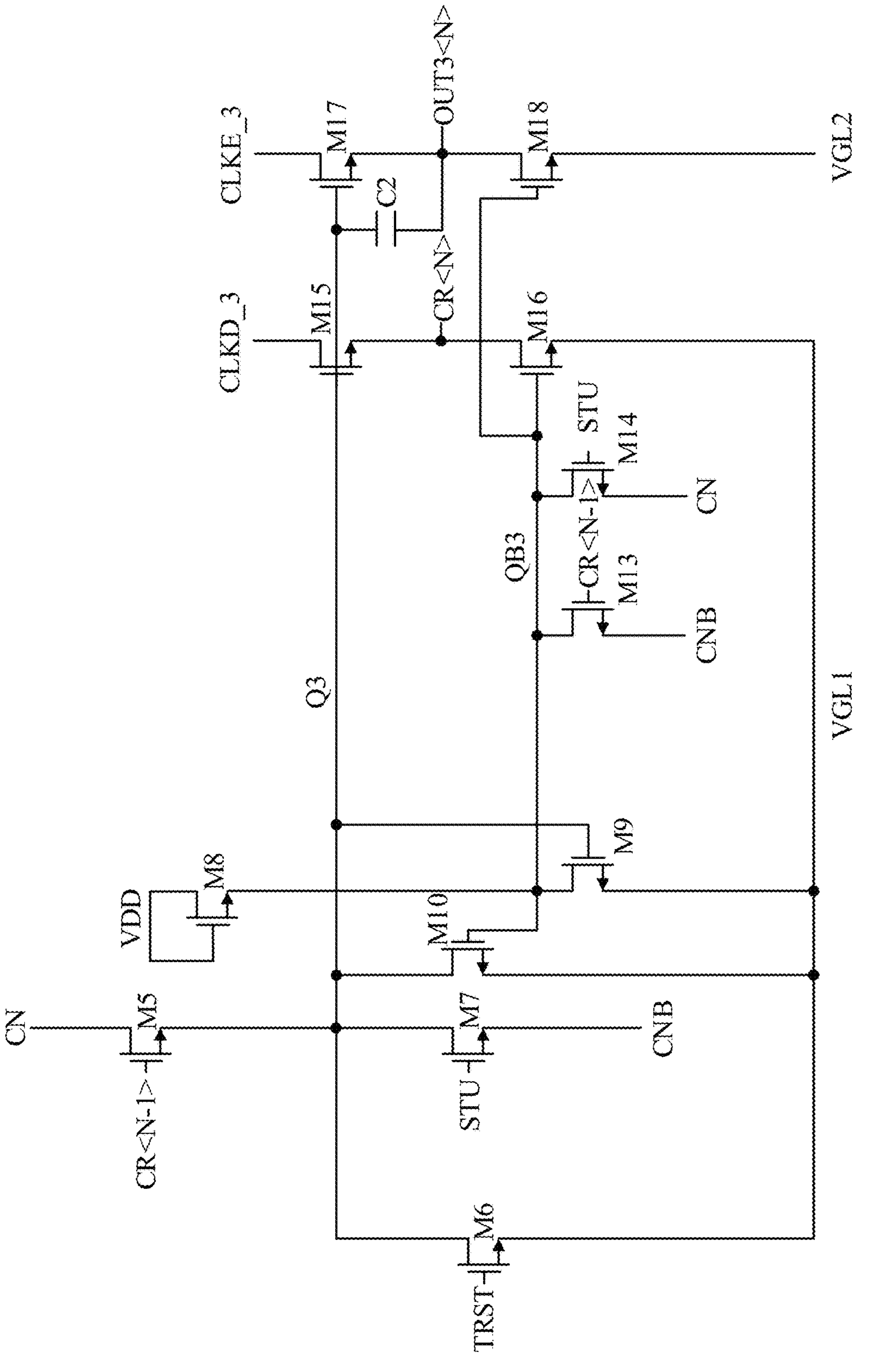
FIG. 3 is a schematic diagram of a dummy GOA2 in related art.
Figure 4:
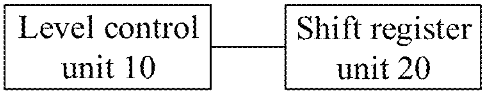
FIG. 4 is an electrical connection schematic diagram of a gate driving circuit according to an embodiment of the present disclosure.

Referring to FIG. 4, a gate driving circuit according to an embodiment of the present disclosure includes a level control unit 10 and a shift register unit 20.

Figure 5:
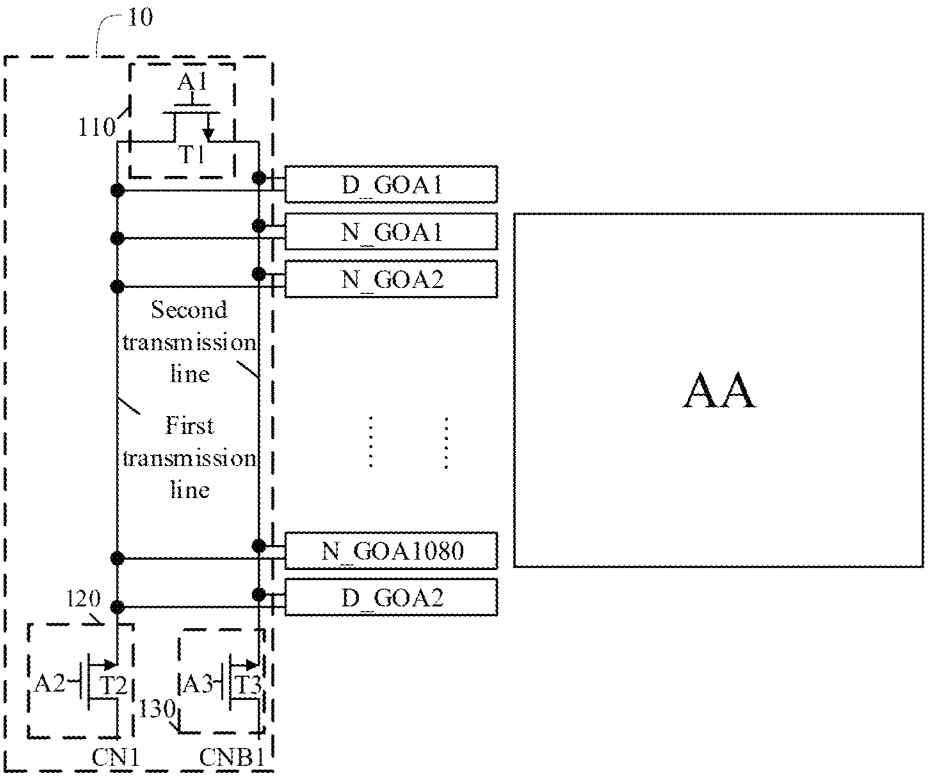
FIG. 5 is a circuit electrical connection schematic diagram of a gate driving circuit according to an embodiment of the present disclosure.

Referring to FIG. 5, the level control unit 10 is electrically connected with a first scan input signal line CN and a second scan input signal line CNB of a scan shift register and a dummy shift register respectively, and is configured to write a first scan control signal CN1 into the first scan input signal line CN of the scan shift register and the dummy shift register and write a second scan control signal CNB1 into the second scan input signal line CNB of the scan shift register and the dummy shift register in response to a first control signal, write the second scan control signal CNB1 into the first scan input signal line CN and the second scan input signal line CNB of the scan shift register and the dummy shift register in response to a second control signal, and write the first scan control signal CN1 into the first scan input signal line CN and the second scan input signal line CNB of the scan shift register and the dummy shift register in response to a third control signal.

It should be added that during forward scanning, the first scan control signal CN1 is at a high level, and the second scan control signal CNB1 is at a low level. During backward scanning, the first scan control signal CN1 is at a low level, and the second scan control signal CNB1 is at a high level.

When the gate driving circuit is in the forward scanning, in a process of scanning an image of a current frame, the level control unit 10 conducts the first scan input signal line CN of the scan shift register and the dummy shift register with the first scan control signal CN1 and conducts the second scan input signal line CNB of the scan shift register and the dummy shift register with the second scan control signal CNB1 in response to the first control signal, that is, the level control unit 10 provides a high-level signal for the first scan control signal CN1 and provides a low-level signal for the second scan control signal CNB1. It should be added that the first control signal causes a first control signal line A1 to provide an inactive-level signal, i.e., a first transistor T1 is turned off, a second control signal line A2 to provide an active-level signal, i.e., a second transistor T2 is turned on, and a third control signal line A3 to provide an active-level signal, i.e., a third transistor T3 is turned on.

After the image of the current frame is scanned and before an image of a next frame is scanned, the level control unit 10 conducts the first scan input signal line CN and the second scan input signal line CNB of the scan shift register and the dummy shift register with the second scan input signal line CNB1 in response to the second control signal, that is, the second scan control signal CNB1 provides a low-level signal for the first scan input signal line CN and the second scan input signal line CNB during the frame reset process. It should be added that the second control signal causes the first control signal line A1 to provide an active-level signal, i.e., the first transistor T1 is turned on, the second control signal line A2 to provide an inactive-level signal, i.e., the second transistor T2 is turned off, and the third control signal line A3 to provide an active-level signal, i.e., the third transistor T3 is turned on.

When the gate driving circuit is in the backward scanning, in a process of scanning an image of a current frame, the level control unit 10 conducts the first scan input signal line CN of the scan shift register and the dummy shift register with the first scan control signal CN1, and conducts the second scan input signal line CNB of the scan shift register and the dummy shift register with the second scan control signal CNB1 in response to the first control signal, that is, the level control unit 10 provides a low-level signal for the first scan control signal line CN1 and provides a high-level signal for the second scan control signal line CNB1.

After the image of the current frame is scanned and before an image of a next frame is scanned, the level control unit 10 conducts the first scan input signal line CN and the second scan input signal line CNB of the scan shift register and the dummy shift register with the first scan control signal CN1 in response to the third control signal, that is, the first scan control signal CN1 provides a low-level signal for the first scan input signal line CN and the second scan input signal line CNB during the frame reset process. It should be added that the third control signal causes the first control signal line A1 to provide an active-level signal, i.e., the first transistor T1 is turned on, the second control signal line A2 to provide an active-level signal, i.e., the second transistor T2 is turned on, and the third control signal line A3 to provide an inactive-level signal, i.e., the third transistor T3 is turned off.

The level control unit 10 is described in detail below. The level control unit 10 includes a first control subunit 110, a second control subunit 120, and a third control subunit 130.

A control end of the first control subunit 110 is electrically connected with a first control signal line A1, a first end of the first control subunit 110 is electrically connected with a first transmission line, and a second end of the first control subunit 110 is electrically connected with a second transmission line.

The first control subunit 110 is configured to conduct the first transmission line and the second transmission line in response to an active-level signal of the first control signal line A1.

In embodiments of the present disclosure, the first control subunit 110 mainly functions as a switch. When the first control signal line A1 provides an active-level signal, the first control subunit 110 conducts the first transmission line and the second transmission line. Obviously, in this case, a signal in the first transmission line and a signal in the second transmission line are the same signal.

It should be added that, the first scan input signal line CN of the scan shift register and the dummy shift register is electrically connected with the first transmission line, and the second scan input signal line CNB of the scan shift register and the dummy shift register is electrically connected with the second transmission line.

In embodiments of the present disclosure, the signal of the first scan input signal line CN of the scan shift register and the dummy shift register is provided by the first transmission line, and the signal of the second scan input signal line CNB of the scan shift register and the dummy shift register is provided by the second transmission line.

For example, referring to FIG. 5, the first control subunit 110 includes a first transistor T1, a control end of the first transistor T1 is electrically connected with the first control signal line A1, a first end of the first transistor T1 is electrically connected with the first transmission line, and a second end of the first transistor T1 is electrically connected with the second transmission line.

In an implementation process, when the first control signal line A1 provides an active-level signal, the first transistor T1 is turned on. The first transmission line is connected with the second transmission line, that is, the first transmission line and the second transmission line transmit the same signal.

A control end of the second control subunit 120 is electrically connected with a second control signal line A2, a first end of the second control subunit 120 is electrically connected with the first transmission line, and a second end of the second control subunit 120 is electrically connected with the first scan control signal CN1.

The second control subunit 120 is configured to write the first scan control signal CN1 into the first transmission line in response to an active-level signal of the second control signal line A2.

In embodiments of the present disclosure, the second control subunit 120 mainly functions to transmit the first scan control signal CN1 to the first transmission line. When the second control signal line A2 provides an active-level signal, the first scan control signal CN1 is transmitted to the first transmission line through the second control subunit 120.

For example, referring to FIG. 5, the second control subunit 120 includes a second transistor T2. A control end of the second transistor T2 is electrically connected with the second control signal line A2, a first end of the second transistor T2 is electrically connected with the first scan control signal CN1, and a second end of the second transistor T2 is electrically connected with the first transmission line.

In an implementation process, when the second control signal line A2 provides an active-level signal, the second transistor T2 is turned on. The first scan control signal CN1 is transmitted to the first transmission line through the second transistor T2 turned on.

A control end of the third control subunit 130 is electrically connected with a third control signal line A3, a first end of the third control subunit 130 is electrically connected with the second transmission line, and a second end of the third control subunit 130 is electrically connected with the second scan control signal CNB1.

The third control subunit 130 is configured to write the second scan control signal CNB1 into the second transmission line in response to an active-level signal of the third control signal line A3.

In embodiments of the present disclosure, the third control subunit 130 mainly functions to transmit the signal provided by the second scan control signal line CNB1 to the second transmission line. When the third control signal line A3 provides an active-level signal, the signal provided by the second scan control signal line CNB1 is transmitted into the second transmission line through the third control subunit 130.

For example, referring to FIG. 5, the third control subunit 130 includes a third transistor T3, a control end of the third transistor T3 is electrically connected with the third control signal line A3, a first end of the third transistor T3 is electrically connected with the second transmission line, and a second end of the third transistor T3 is electrically connected with the second scan control signal CNB1.

In an implementation process, when the third control signal line A3 provides an active-level signal, the third transistor T3 is turned on. The second scan control signal CNB1 is transmitted to the second transmission line through the third transistor T3 turned on.

In addition, it should be noted that the first control signal causes the first control signal line A1 to provide an inactive-level signal, the second control signal line A2 to provide an active-level signal, and the third control signal line A3 to provide an active-level signal.

That is, in a process of forward scanning, when the gate driving circuit inputs a scan drive signal to the gate line, the second control signal line A2 provides an active-level signal, the second transistor T2 is turned on. The first scan control signal CN1 provides a high-level signal for the first scan input signal line CN of the scan shift register and the dummy shift register. The third control signal line A3 provides an active-level signal, the third transistor T3 is turned on. The second scan control signal CNB1 provides a low-level signal to the second scan input signal line CNB of the scan shift register and the dummy shift register.

In a process of backward scanning, when the gate driving circuit inputs a scan drive signal to the gate line, the second control signal line A2 provides an active-level signal, the second transistor T2 is turned on. The first scan control signal CN1 provides a low-level signal for the first scan input signal line CN of the scan shift register and the dummy shift register. The third control signal line A3 provides an active-level signal, the third transistor T3 is turned on. The second scan control signal CNB1 provides a high-level signal to the second scan input signal line CNB of the scan shift register and dummy shift register.

The second control signal causes the first control signal line A1 to provide an active-level signal, the second control signal line A2 to provide an inactive-level signal, and the third control signal line A3 to provide an active-level signal.

That is, during the forward scanning, after the image of the current frame is scanned, and in the frame reset process before scanning the image of the next frame, the third control signal line A3 provides an active-level signal, the third transistor T3 is turned on. The second scan control signal CNB1 provides a low-level signal to the second scan input signal line CNB of the scan shift register and the dummy shift register. The first control signal line A1 provides an active-level signal, the first transistor T1 is turned on. The first transmission line and the second transmission line are conducted, and a low-level signal is provided to the first transmission line through the second transmission line, and then provided to the first scan input signal line CN of the scan shift register and dummy shift register. That is, the signal to which the first scan input signal line CN is connected is a low-level signal.

The third control signal causes the first control signal line A1 to provide an active-level signal, the second control signal line A2 to provide an active-level signal, and the third control signal line A3 to provide an inactive-level signal.

That is, during the backward scanning, after the current frame image is scanned, and in the frame reset process before scanning the image of the next frame, the second control signal line A2 provides an active-level signal, the second transistor T2 is turned on. The first scan control signal CN1 provides a low-level signal for the first scan input signal line CN of the scan shift register and the dummy shift register. The first control signal line A1 provides an active-level signal, the first transistor T1 is turned on. The first transmission line and the second transmission lines are conducted. The low-level signal is provided to the second transmission line through the first transmission line, and then provided to the second scan input signal line CNB of the scan shift register and the dummy shift register. That is, the signal in the second scan input signal line CNB is a low-level signal.

In embodiments of the present disclosure, the shift register unit 20 includes a scan shift register and a dummy shift register. The scan shift register is electrically connected with a gate line, and is configured to input a scan drive signal to the gate line according to a signal of a first scan input signal line CN and a signal of a second scan input signal line CNB. The dummy shift register is electrically connected with the scan shift register, and is configured to input a cascade drive signal to the scan shift register according to the signal of the first scan input signal line CN and the signal of the second scan input signal line CNB.

In an implementation process, the scan shift register is electrically connected with a corresponding gate line. During the forward scanning and the backward scanning of the display panel, the scan shift register can input a scan drive signal to the gate line according to signals provided by the first scan input signal line CN and the second scan input signal line CNB.

In order to ensure the normal operation of the scan shift register, a dummy shift register is further provided in embodiments of the present disclosure. In an implementation process, the dummy shift register inputs a cascade drive signal to the scan shift register according to signals provided by the first scan input signal line CN and the second scan input signal line CNB.

Generally, the number of dummy shift registers is at least two. One of the dummy shift registers is arranged in the front row of the first row of scan shift register. The dummy shift register inputs a cascade drive signal to the scan shift register of the first row. The cascade drive signal is used as an input signal for the scan shift register of the first row, so that the scan shift register of the first row starts to work as soon as possible. The other dummy shift register is arranged at the next row of the last row of scan shift register. The dummy shift register inputs a cascade drive signal to the scan shift register of the last row. The cascade drive signal is used as a reset signal for the scan shift register of the last row, so that the scan shift register of the last row clear data after display of the data of the row is completed.

In embodiments of the present disclosure, transistors originally provided in the scan shift register and the dummy shift register for frame reset are omitted, to save the cost and improve the yield of the panel. However, in order to enable the scan shift register and the dummy shift register to clear data after display of the data of the current frame is completed, the level control unit 10 is set. That is, the level control unit 10 cooperates with the scan shift register and the dummy shift register after the transistors for frame reset are removed, to complete an operation of inputting a scan drive signal to the gate line. This includes resetting the gate driving circuit before start of scanning the next frame of image.

The shift register unit 20 is described below.

(1) The shift register unit 20 in embodiments of the present disclosure includes a plurality of scan shift registers, and the plurality of scan shift register are arranged in cascade.

The plurality of cascaded scan shift registers are driven row-by-row, and provide scan drive signals for gate lines corresponding to respective rows of pixel units. The scan shift register of the upper row also outputs a cascade signal to the scan shift register of the lower row. The operation of the plurality of scan shift registers will not be described here.

The dummy shift register in embodiments of the present disclosure includes a first dummy shift register. A first input signal line of the first dummy shift register is electrically connected with a frame start signal line STU. A second input signal line of the first dummy shift register is electrically connected with a cascade signal output end of a first-level scan shift register of the plurality of scan shift registers, and a cascade output signal line of the first dummy shift register is electrically connected with a first input signal line of the first-level scan shift register.

That is, in a first case, when at least one dummy shift register (i.e., the first dummy shift register) is provided in front of the scan shift register in the first row, a signal of the frame start signal line STU is provided to the first input signal line of the first dummy shift register, to cause the cascade output signal line of the first dummy shift register to output a signal.

The cascade output signal line of the first dummy shift register is electrically connected with the first input signal line of the first-level scan shift register. That is, a signal of the cascade output signal line of the first dummy shift register is used as the first input signal line of the first-level scan shift register to cause the first-level scan shift register to start a scan process.

A reset signal line (i.e., the second input signal line) of the first dummy shift register is electrically connected with a cascade signal output end of the first-level scan shift register of the plurality of scan shift registers. A signal at the cascade signal output end of the first-level scan shift register is used to provide a signal for resetting a row of the first-level scan shift register to the first dummy shift register.

(2) The shift register unit 20 includes a plurality of scan shift registers, and the plurality of scan shift registers are arranged in cascade.

The plurality of cascaded scan shift registers are driven row-by-row, and provide scan drive signals for gate lines corresponding to respective rows of pixel units. The scan shift register of the upper row also outputs a cascade signal to the scan shift register of the lower row. The operation of the plurality of scan shift registers will not be described here.

The dummy shift register includes a second dummy shift register. A first input signal line of the second dummy shift register is connected with a cascade signal output end of a last-level scan shift register of the plurality of scan shift registers, a second input signal line of the second dummy shift register is electrically connected with a frame start signal line STU, and a cascade output signal line of the second dummy shift register is electrically connected with a second input signal line of the last-level scan shift register.

That is, in a second case, when at least one dummy shift register (i.e., the second dummy shift register) is provided after the scan shift register in the last row, a cascade signal output end of the last-level scan shift register of the plurality of scan shift registers provides a signal of the first input signal line to the second dummy shift register, to start the second dummy shift register to operate.

A signal of the cascade output signal line of the second dummy shift register is used to provide a signal to the second input signal of the last-level scan shift register, to cause the last-level scan shift register to be used for resetting of a row of the last-level scan shift register.

A reset signal line (i.e., the second input signal line) of the second dummy shift register is electrically connected with a frame start signal line STU. A signal of the frame start signal line STU provides a signal for frame reset to the second dummy shift register.

Figure 6:
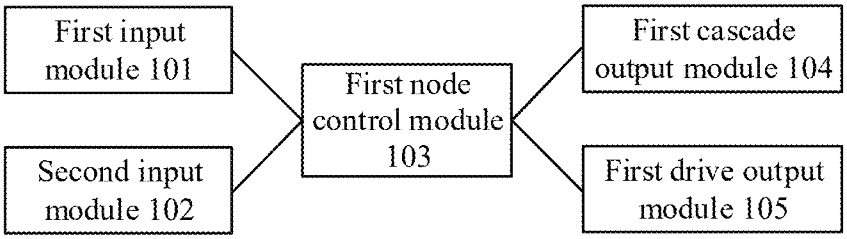
FIG. 6 is an electrical connection schematic diagram of a scan shift register according to an embodiment of the present disclosure.

Next, a structure of a single scan shift register is descripted. For the sake of simplicity, a working process of a following scan shift register is described in detail by taking forward scanning as an example. As shown in FIG. 6, the scan shift register includes following modules.

A first input module 101 is configured to provide the signal of the first scan input signal line CN to a pull-up node Q1 in response to a signal of a first input signal line CR<N−1>.

Figure 7:
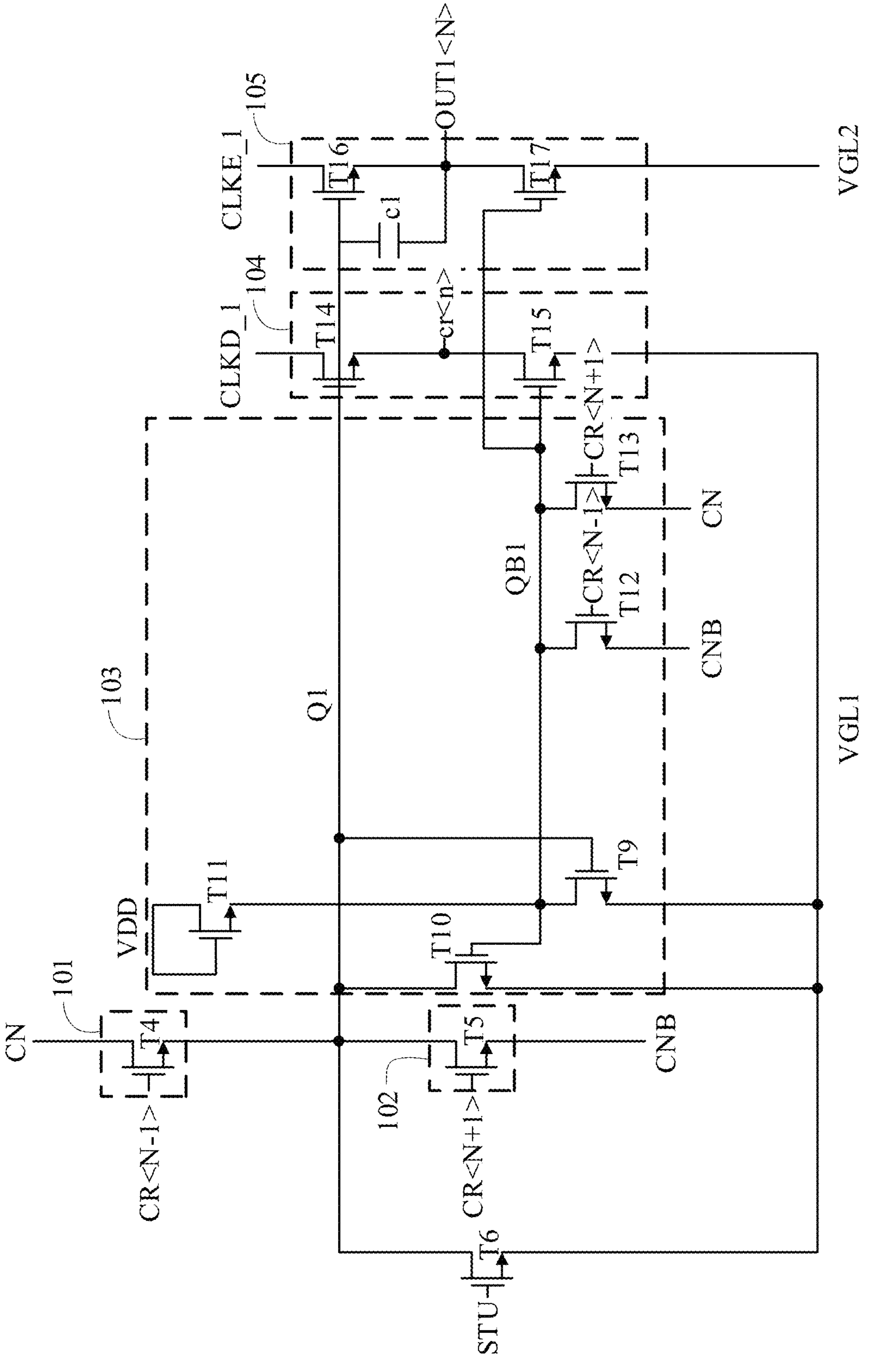
FIG. 7 is a circuit electrical connection schematic diagram of a scan shift register according to an embodiment of the present disclosure.

For example, referring to FIG. 7, the first input module 101 includes a fourth transistor T4.

A control end of the fourth transistor T4 is electrically connected with the first input signal line CR<N−1>, a first end of the fourth transistor T4 is electrically connected with the first scan input signal line CN, and a second end of the fourth transistor T4 is electrically connected with the pull-up node Q1.

In an implementation process, when the signal of the first input signal line CR<N−1> is at a high level, the fourth transistor T4 is turned on. The signal of the first scan input signal line CN is provided to the pull-up node Q1, that is, the pull-up node Q1 is written with a high-level signal.

A second input module 102 is configured to provide the signal of the second scan input signal line CNB to the pull-up node Q1 in response to a signal of a second input signal line CR<N+1>.

For example, referring to FIG. 7, the second input module 102 includes a fifth transistor T5.

A control end of the fifth transistor T5 is electrically connected with the second input signal line CR<N+1>, a first end of the fifth transistor T5 is electrically connected with the pull-up node Q1, and a second end of the fifth transistor T5 is electrically connected with the second scan input signal line CNB.

In an implementation process, when the second input signal line CR<N+1> provides a high-level signal, the fifth transistor T5 is turned on. A signal in the second scan input signal line CNB is provided to the pull-up node Q1, and the pull-up node Q1 is written with a low-level signal.

A first node control module 103 is configured to control a signal of the pull-up node Q1 and a signal of a pull-down node QB1.

For example, referring to FIG. 7, the first node control module 103 includes a ninth transistor T9, a tenth transistor T10, an eleventh transistor T11, and a twelfth transistor T12And a thirteenth transistor T13.

A control end of the ninth transistor T9 is electrically connected with the pull-up node Q1, a first end of the ninth transistor T9 is electrically connected with the pull-down node QB1, and a second end of the ninth transistor T9 is electrically connected with a first reference signal line VGL1.

In an implementation process, when the pull-up node Q1 is at a high level, the ninth transistor T9 is turned on. A low level provided by the first reference signal line VGL1 is provided to the pull-down node QB1 through the ninth transistor T9 turned on, and the pull-down node QB1 is written with a low-level signal.

A control end of the tenth transistor T10 is electrically connected with the pull-down node, a first end of the tenth transistor T10 is electrically connected with the pull-up node Q1, and a second end of the tenth transistor T10 is electrically connected with the first reference signal line VGL1.

In an implementation process, when the pull-down node QB1 is at a high level, the tenth transistor T10 is turned on. A low level provided by the first reference signal line VGL1 is provided to the pull-up node Q1 through tenth transistor T10 turned on, so that the pull-up node Q1 is written with a low-level signal, to realize resetting after scanning of the row is completed.

A control end of the eleventh transistor T11 is electrically connected with a power supply signal line VDD, a first end of the eleventh transistor T11 is electrically connected with the power supply signal line VDD, and a second end of the eleventh transistor T11 is electrically connected with the pull-down node.

In an implementation process, in a stage except that the pull-up node Q1 is at a high level and the pull-down node QB1 is at a low level, the power supply signal line VDD is at a high level, and the eleventh transistor T11 is turned on. The high level provided by the power supply signal line VDD is provided to the pull-down node QB1, that is, the pull-down node QB1 is written with a high level.

A control end of the twelfth transistor T12 is electrically connected with the first input signal line CR<N−1> of the scan shift register, a first end of the twelfth transistor T12 is electrically connected with the pull-down node QB1, and a second end of the twelfth transistor T12 is electrically connected with the second scan input signal line CNB.

In an implementation process, when the first input signal line CR<N−1> of the scan shift register provides a high-level signal, the twelfth transistor T12 is turned on. A low-level signal provided by the second scan input signal line CNB is provided to the pull-down node QB1 through the twelfth transistor T12 turned on, and the pull-down node QB1 is written with a low-level signal.

A control end of the thirteenth transistor T13 is electrically connected with the second input signal line CR<N+1> of the scan shift register, a first end of the thirteenth transistor T13 is electrically connected with the pull-down node QB1, and a second end of the thirteenth transistor T13 is electrically connected with the first scan input signal line CN.

In an implementation process, when the second input signal line CR<N+1> of the scan shift register is at a high level, the thirteenth transistor T13 is turned on. A high-level signal provided by the first scan input signal line CN is provided to the pull-down node QB1 through the thirteenth transistor T13 turned-on, and the pull-down node QB1 is written with a high-level signal.

A first cascade output module 104 is configured to provide a signal of a cascade clock signal line CLKD_1 to the cascade signal output end cr<n> in response to the signal of the pull-up node Q1; or provide a signal of a first reference signal line VGL1 to the cascade signal output end cr<n> in response to the signal of the pull-down node QB1.

For example, referring to FIG. 7, the first cascade output module 104 includes a fourteenth transistor T14 and a fifteenth transistor T15.

A control end of the fourteenth transistor T14 is electrically connected with the pull-up node Q1, a first end of the fourteenth transistor T14 is electrically connected with the cascade clock signal line CLKD_1, and a second end of the fourteenth transistor T14 is electrically connected with the cascade signal output end cr<n>.

In an implementation process, when the pull-up node Q1 is a high-level signal, the fourteenth transistor T14 is turned on. A high-level signal provided by the cascade clock signal line CLKD_1 is written to the cascade signal output end cr<n> through the fourteenth transistor T14 turned on.

A control end of the fifteenth transistor T15 is electrically connected with the pull-down node QB1, a first end of the fifteenth transistor T15 is electrically connected with the cascade signal output end cr<n>, and a second end of the fifteenth transistor T15 is electrically connected with the first reference signal line VGL1.

In an implementation process, when the pull-down node QB1 is a high-level signal, the fifteenth transistor T15 is turned on. A low-level signal provided by the first reference signal line VGL1 is written into the cascade signal output end cr<n> to reset the cascade signal output end cr<n>.

A first drive output module 105 is configured to provide a signal of a clock signal line CLKE_1 to a drive output end OUT1<N> in response to the signal of the pull-up node Q1; or provide a signal of a second reference signal line VGL2 to the drive output end OUT1<N> in response to the signal of the pull-down node QB1.

For example, referring to FIG. 7, the first drive output module 105 includes a sixteenth transistor T16, a seventeenth transistor T17, and a first capacitor c1.

A control end of the sixteenth transistor T16 is electrically connected with the pull-up node Q1, a first end of the sixteenth transistor T16 is electrically connected with the clock signal line CLKE_1, and a second end of the sixteenth transistor T16 is electrically connected with the drive output end OUT1<N>.

In an implementation process, when the pull-up node Q1 is a high-level signal, the sixteenth transistor T16 is turned on. A high-level signal provided by the clock signal line CLKE_1 is written into the drive output end OUT1<N> through the sixteenth transistor T16 turned on.

A control end of the seventeenth transistor T17 is electrically connected with the pull-down node QB1, a first end of the seventeenth transistor T17 is electrically connected with the drive output end OUT1<N>, and a second end of the seventeenth transistor T17 is electrically connected with the second reference signal line VGL2.

In an implementation process, when a signal at the pull-down node QB1 is at a high level, the seventeenth transistor T17 is turned on. A low-level signal provided by the second reference signal line VGL2 is written into the drive output end OUT1<N> through the seventeenth transistor T17 turned on, and the drive output end OUT1<N> may provide a low-level signal to the gate line.

In embodiments of the present disclosure, a first end of the first capacitor c1 is electrically connected with the pull-up node Q1, a second end of the first capacitor c1 is electrically connected with the drive output end OUT1<N>. In a case that the fourth transistor T4 is turned on, a high level may be transferred to the pull-up node Q1, causing a voltage of the pull-up node Q1 to rise, and the first capacitor c1 may also be charged at the same time. In a case that the fourth transistor T4 is turned off, the first capacitor c1 can be discharged so that the pull-up node Q1 remains high, to maintain the sixteenth transistor T16 to be in an on state.

In addition, when the sixteenth transistor T16 is turned on and a signal provided by the clock signal line CLKE_1 changes from a high level to a low level, the drive output end OUT1<N> outputs a low level. Meanwhile, due to a bootstrap effect of the first capacitor c1, a voltage at the pull-up node Q1 also drops.

It should be noted that the gate driving circuit needs to be reset after a frame of image is scanned, to avoid influence display of an image of a next frame. In view of this, the scan shift register further includes a frame reset module, and the frame reset module is electrically connected with the pull-up node.

The frame reset module is configured to provide a signal of a first reference signal line VGL1 to the pull-up node Q1 in response to a signal of the frame start signal line STU.

For example, referring to FIG. 7, the frame reset module includes a sixth transistor T6.

A control end of the sixth transistor T6 is electrically connected with the frame start signal line STU, a first end of the sixth transistor T6 is electrically connected with the pull-up node Q1, and a second end of the sixth transistor T6 is electrically connected with the first reference signal line VGL1.

In an implementation process, after a frame of image is completely scanned, a frame start signal line STU provides a high-level signal. Thus, the sixth transistor T6 is turned on, and a low-level signal provided by the first reference signal line VGL1 is written into the pull-up node Q1, to reset the pull-up node Q1 after a frame of image is scanned.

Because the shift register unit 20 according to embodiments of the present disclosure can realize bidirectional scanning, during the backward scanning, functions of the first input module 101 and the second input module 102 of the scan shift register are exchanged. That is, during the forward scanning, the first input module 101 serves as an input module, and the first input signal line serves as an input signal line. When the gate driving circuit realizes the backward scanning of the gate line, functions of the first input module 101 and the second input module 102 of each scan shift register are exchanged. During the backward scanning, the second input module 102 of each scan shift register serves as an input module, the second input signal line serves as an input signal line, the first input module 101 of each scan shift register serves as a reset module, and the first input signal line serves as a reset signal line. In this case, an electrical connection relationship of the circuit is not changed, and just a function of the circuit is changed.

Figure 8:
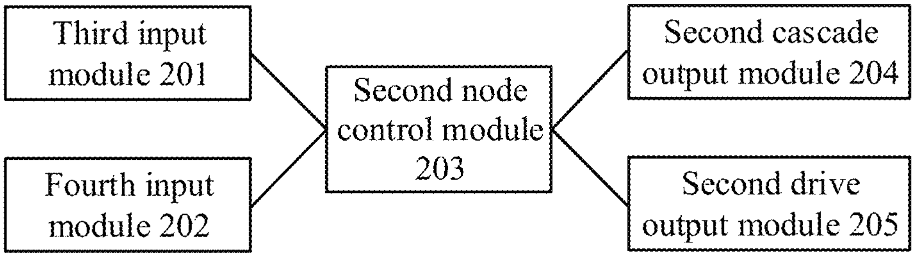
FIG. 8 is an electrical connection schematic diagram of a dummy shift register according to an embodiment of the present disclosure.

Next, construction of a single dummy shift register is described. For the sake of simplicity, a working process of a following dummy shift register is described in detail by taking forward scanning as an example. As shown in FIG. 8, the dummy shift register includes following modules.

A third input module 201 is configured to provide the signal of the first scan input signal line CN to a pull-up node Q2 of the first dummy shift register or a pull-up node Q3 of the second dummy shift register in response to a signal of a first input signal line STU.

Figure 9:
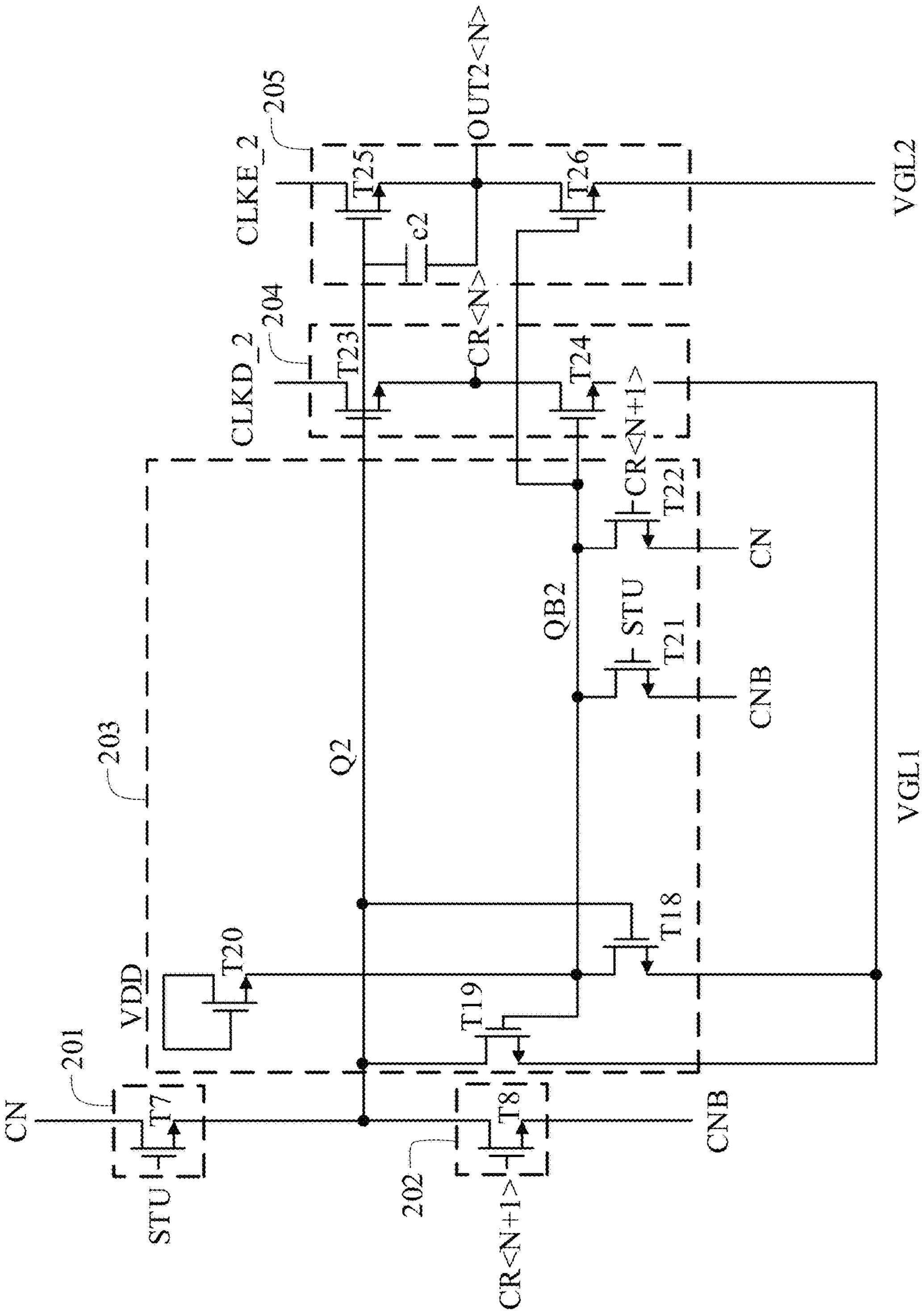
FIG. 9 is a circuit electrical connection schematic diagram of a first dummy shift register according to an embodiment of the present disclosure.

For example, referring to FIG. 9, the third input module 201 includes a seventh transistor T7.

A control end of the seventh transistor T7 is electrically connected with the first input signal line STU, a first end of the seventh transistor T7 is electrically connected with the first scan input signal line CN, and a second end of the seventh transistor T7 is electrically connected with the pull-up node Q2.

Figure 10:
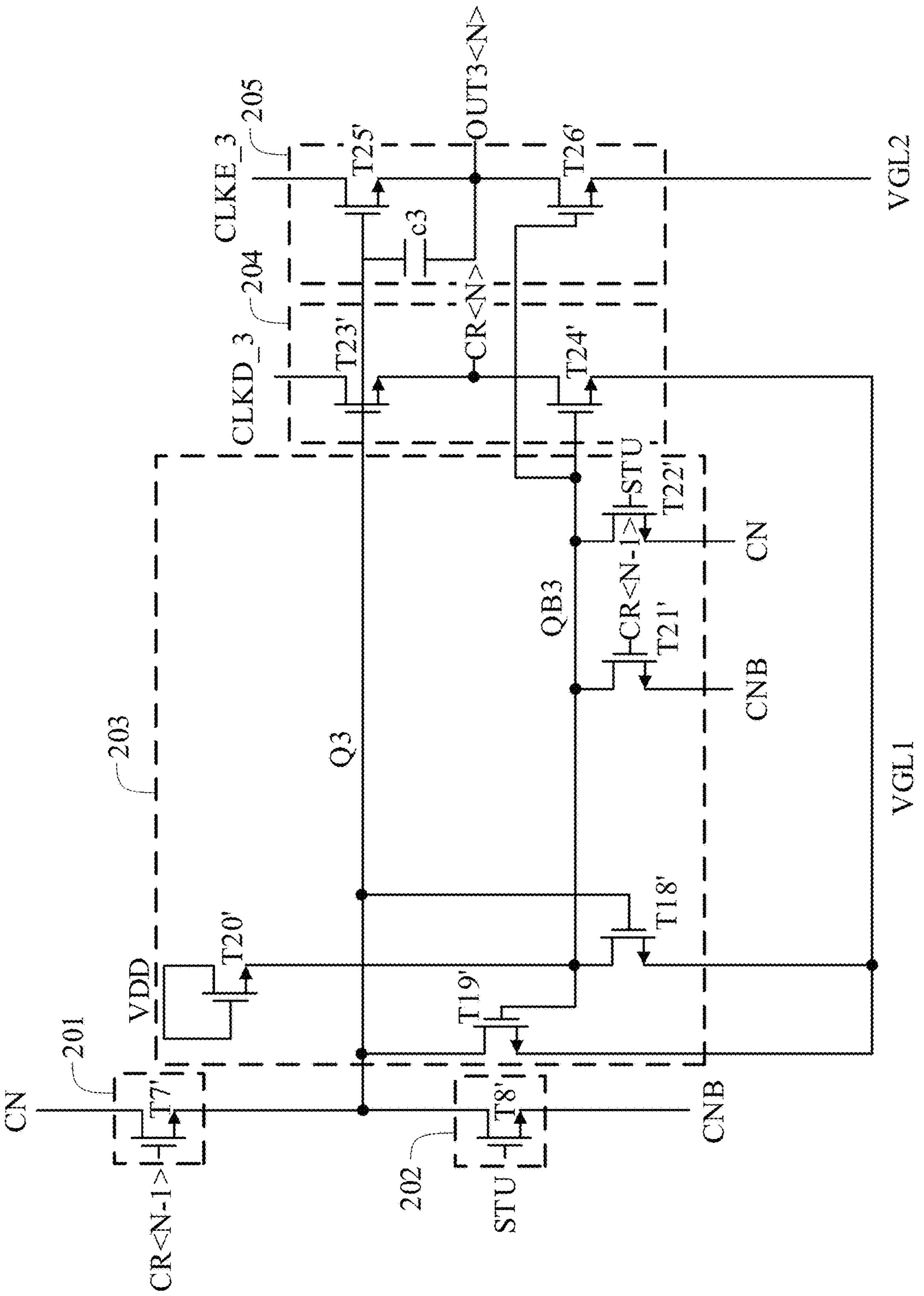
FIG. 10 is a circuit electrical connection schematic diagram of a second dummy shift register according to an embodiment of the present disclosure.

In an implementation process, when a signal provided by the first input signal line is at a high level, the seventh transistor T7 is turned on. A high-level signal provided by the first scan input signal line CN is written into the pull-up node Q2 through the seventh transistor T7 turned on, and the pull-up node Q2 is brought to a high level. It should be noted that when the dummy shift register is the first dummy shift register, the first input signal line is electrically connected with the frame start signal line STU. When the dummy shift register is the second dummy shift register, the first input signal line is electrically connected with the cascade signal output end CR<N−1> of the last-level scan shift register, as shown in FIG. 10.

A fourth input module 202 is configured to provide the signal of the second scan input signal line CNB to the pull-up node Q2 in response to a signal of the second input signal line CR<N+1>.

For example, referring to FIG. 9, the fourth input module 202 includes an eighth transistor T8.

A control end of the eighth transistor T8 is electrically connected with the second input signal line CR<N+1>, a first end of the eighth transistor T8 is electrically connected with the pull-up node Q2, and a second end of the eighth transistor T8 is electrically connected with the second scan input signal line CNB.

In an implementation process, when the signal of the second input signal line CR<N+1> is at a high level, the eighth transistor T8 is turned on. A low level provided by the second scan input signal line CNB causes the pull-up node Q2 to be written to a low level, to achieve reset of the pull-up node Q2. It should be noted that, when the dummy shift register is the first dummy shift register, the second input signal line is electrically connected with the cascade signal output end CR<N+1> of the first-level scan shift register. When the dummy shift register is the second dummy shift register, the second input signal line is electrically connected with the frame start signal line STU.

A second node control module 203 is configured to control a signal of the pull-up node and a signal of a pull-down node.

For example, referring to FIG. 9, the second node control module 203 includes an eighteenth transistor T18, a nineteenth transistor T19, a twentieth transistor T20, and a twenty-first transistor T21 and a twenty-second transistor T22.

The electrical connection relationship and conduction of above transistors will be described in detail referring to FIG. 9.

A control end of the eighteenth transistor T18 is electrically connected with the pull-up node of the dummy shift register, a first end of the eighteenth transistor T18 is electrically connected with the pull-down node of the dummy shift register, and a second end of the eighteenth transistor T18 is electrically connected with a first reference signal line VGL1 of the dummy shift register.

In an implementation process, when the pull-up node Q2 of the dummy shift register is at a high level, the eighteenth transistor T18 is turned on. A low level provided by the first reference signal line VGL1 is written to the pull-up node Q2 through the eighteenth transistor T18 turned on, and pull-down node QB2 of the dummy shift register is set to a low level.

A control end of the nineteenth transistor T19 is electrically connected with the pull-down node QB2 of the dummy shift register, a first end of the nineteenth transistor T19 is electrically connected with the pull-up node Q2 of the dummy shift register, and a second end of the nineteenth transistor T19 is electrically connected with the first reference signal line VGL1 of the dummy shift register.

In an implementation process, when the pull-down node QB2 of the dummy shift register is at a high level, the nineteenth transistor T19 is turned on. A low level of the first reference signal line VGL1 of the dummy shift register is provided to the pull-up node Q2 through the nineteenth transistor T19 turned on, and the pull-up node Q2 of the dummy shift register is set to a low level, to realize resetting after scanning of the row is completed.

A control end of the twentieth transistor T20 is electrically connected with a power supply signal line VDD of the dummy shift register, a first end of the twentieth transistor T20 is electrically connected with the power supply signal line VDD of the dummy shift register, and a second end of the twentieth transistor T20 is electrically connected with the pull-down node QB2 of the dummy shift register.

In an implementation process, except for a stage when the pull-up node Q2 of the dummy shift register is at a high level and the pull-down node QB2 is at a low level, the power supply signal line VDD is at a high level, and the twentieth transistor T20 is turned on. The high level of the power supply signal line VDD brings the pull-down node QB2 of the dummy shift register to a high level.

Referring to FIG. 9, a control end of the twenty-first transistor T21 is connected with the frame start signal line STU of the first dummy shift register, a first end of the twenty-first transistor T21 is electrically connected with the pull-down node QB2 of the dummy shift register, and a second end of the twenty-first transistor T21 is electrically connected with the second scan input signal line CNB.

In an implementation process, when the first input signal line STU of the first dummy shift register is at a high level, the twenty-first transistor T21 is turned on. A low-level signal of the second scan input signal line CNB is provided to the pull-down node QB2 through the twenty-first transistor T21 turned on, so that the pull-down node QB2 is at a low level.

Referring to FIG. 10, a control end of the twenty-first transistor T21' is electrically connected with the first input signal line CR<N−1>, a first end of the twenty-first transistor T21' is electrically connected with the pull-down node QB3 of the dummy shift register, and a second end of the twenty-first transistor T21' is electrically connected with the second scan input signal line end CNB.

In an implementation process, when the first input signal line CR<N−1> of the second dummy shift register is at a high level, the twenty-first transistor T21' is turned on. A low-level signal of the second scan input signal line CNB is provided to the pull-down node QB3 through the twenty-first transistor T21' turned on, so that the pull-down node QB3 is at a low level.

Referring to FIG. 9, a control end of the twenty-second transistor T22 is electrically connected with the second input signal line CR<N+1>, a first end of the twenty-second transistor T22 is electrically connected with the pull-down node QB2 of the first dummy shift register, and a second end of the twenty-second transistor T22 is electrically connected with the first scan input signal line CN.

Referring to FIG. 10, a control end of the twenty-second transistor T22' is electrically connected with the frame start signal line STU of the second shift register, a first end of the twenty-second transistor T22' is electrically connected with the pull-down node QB3 of the second dummy shift register, and a second end of the twenty-second transistor T22' is electrically connected with the first scan input signal line CN.

In an implementation process, when the second input signal line CR<N+1> of the first dummy shift register is at a high level, the twenty-second transistor T22 is turned on. A high-level signal provided by the first scan input signal line CN is written to the pull-down node QB2 through the twenty-second transistor T22 turned-on, so that the pull-down node QB2 is at a high level.

In an implementation process, when the frame start signal line STU of the second shift register is at a high level, the twenty-second transistor T22' is turned on. A high-level signal provided by the first scan input signal line CN is written to the pull-down node QB3 through the twenty-second transistor T22' turned on, so that the pull-down node QB3 is at a high level.

A second cascade output module 204 is configured to provide a signal of a cascade clock signal line to the cascade output signal line CR<N> in response to the signal of the pull-up node Q3; or provide a signal of a first reference signal line VGL1 to the cascade output signal line CR<N> in response to the signal of the pull-down node QB3.

For example, referring to FIG. 9, the second cascade output module 204 includes a twenty-third transistor T23 and a twenty-fourth transistor T24.

As illustrated in FIG. 9, a control end of the twenty-third transistor T23 is electrically connected with the pull-up node Q2 of the first dummy shift register, a first end of the twenty-third transistor T23 is electrically connected with the cascade clock signal line CLKD_2 of the dummy shift register, and a second end of the twenty-third transistor T23 is electrically connected with the cascade output signal line CR<N> of the dummy shift register.

In an implementation process, when the pull-up node Q2 of the first dummy shift register is a high-level signal, the twenty-third transistor T23 is turned on. A high-level signal of the cascade clock signal line CLKD_2 is written to the cascade output signal line CR<N> through the twenty-third transistor T23 turned-on.

A control end of the twenty-fourth transistor T24 is electrically connected with the pull-down node QB2 of the first dummy shift register, a first end of the twenty-fourth transistor T24 is electrically connected with the cascade output signal line CR<N> of the first dummy shift register, and a second end of the twenty-fourth transistor T24 is electrically connected with the first reference signal line VGL1 of the dummy shift register.

In an implementation process, when the pull-down node QB2 of the first dummy shift register is a high-level signal, the twenty-fourth transistor T24 is turned on. A low-level signal on the first reference signal line VGL1 is written into the cascade output signal line CR<N> through the twenty-fourth transistor T24 turned on, to reset the cascade output signal line CR<N>.

A second drive output module 205 is configured to provide a signal of a clock signal line CLKE_2 to a drive output end OUT2<N> in response to the signal of the pull-up node Q2; or provide a signal of a second reference signal line VGL2 to the drive output end OUT2<N> in response to the signal of the pull-down node QB2.

For example, referring to FIG. 9, the second drive output module 205 includes a twenty-fifth transistor T25, a twenty-sixth transistor T26, and a second capacitor c2.

As illustrated in FIG. 9, a control end of the twenty-fifth transistor T25 is electrically connected with the pull-up node Q2 of the first dummy shift register, a first end of the twenty-fifth transistor T25 is electrically connected with the clock signal line CLKE_2 of the first dummy shift register, and a second end of the twenty-fifth transistor T25 is electrically connected with the drive output end OUT2<N> of the first dummy shift register.

In an implementation process, when the pull-up node Q2 of the first dummy shift register is a high-level signal, the twenty-fifth transistor T25 is turned on. A high-level signal of the clock signal line CLKE_2 of the first dummy shift register is provided to the drive output end OUT2<N> through the twenty-fifth transistor T25 turned on.

A control end of the twenty-sixth transistor T26 is electrically connected with the pull-down node QB2 of the first dummy shift register, a first end of the twenty-sixth transistor T26 is electrically connected with the drive output end OUT2<N> of the first dummy shift register, and a second end of the twenty-sixth transistor T26 is electrically connected with the second reference signal line VGL2.

In an implementation process, when the signal at the pull-down node QB2 of the first dummy shift register is at a high level, the twenty-sixth transistor T26 is turned on. A low-level signal of the second reference signal line VGL2 is written into the drive output end OUT2<N> through turned-on twenty-sixth transistor T26.

In embodiments of the present disclosure, a first end of the second capacitor c2 is electrically connected with the pull-up node Q2, and a second end of the second capacitor c2 is electrically connected with the drive output end OUT2<N>. In a case that the seventh transistor T7 is turned on, a high level may be transferred to the pull-up node Q2, causing a voltage of the pull-up node Q2 to rise. The first capacitor c1 may also be charged at the same time. In a case that the seventh transistor T7 is turned off, the second capacitor c2 may be discharged so that the pull-up node Q2 remains high, to maintain the twenty-fifth transistor T25 to be in an on state.

In addition, when the twenty-fifth transistor T25 is turned on and the clock signal line CLKE_2 changes from a high level to a low level, the drive output end OUT2<N> outputs a low level. Meanwhile, due to a bootstrap effect of the first capacitor c1, a voltage of the pull-up node Q2 also drops.

Similarly, the shift register unit 20 according to embodiments of the present disclosure can realize bidirectional scanning. During the backward scanning, functions of the third input module 201 and the fourth input module 202 of the dummy shift register are exchanged. That is, during the forward scanning, the third input module 201 serves as an input module, and the third input signal line serves as an input signal line. When the gate driving circuit realizes the backward scanning of the gate line, functions of the third input module 201 and the fourth input module 202 of each dummy shift register are exchanged. That is, with respect to the forward scanning, during the backward scanning, the fourth input module 202 of each dummy shift register serves as an input module, the second input signal line serves as an input signal line, the third input module 201 of each dummy shift register serves as a reset module, and the first input signal line serves as a reset signal line. In this case, an electrical connection relationship of the circuit is not changed, and just a function of the circuit is changed.

Figure 11:
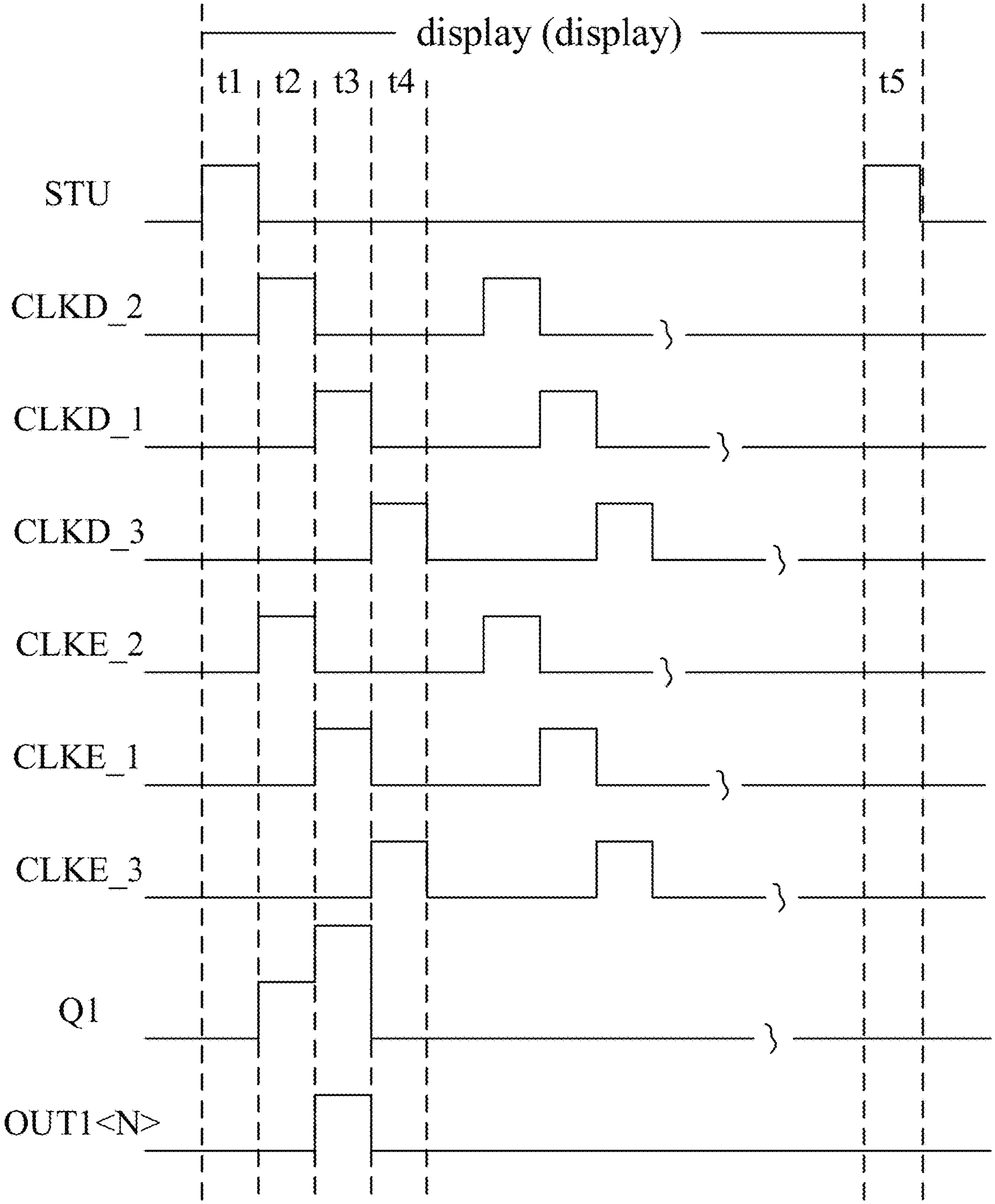
FIG. 11 is a simulation waveform diagram of a gate driving circuit according to an embodiment of the present disclosure.

Referring to FIG. 11, a working process of the gate driving circuit in the forward scanning process is described below in combination with a timing diagram. The gate driving circuit includes three shift registers of a first dummy shift register, a scan dummy shift register, and a second dummy shift register. A drive output end of the scan dummy shift register provides a scan signal for a corresponding gate line.

In a stage of time t1, the first control signal line A1 in the level control unit 10 provides an inactive-level signal, that is, the first transistor T1 is turned off. The second control signal line A2 provides an active-level signal, that is, the second transistor T2 is turned on. The third control signal line A3 provides an active-level signal, that is, the third transistor T3 is turned on. The cascade clock signal line CLKD_1 in the shift register unit 20 is at a low level, the clock signal line CLKE_1 is at a low level, the first reference signal line VGL1 is at a low level, the second reference signal line VGL2 is at a low level, and the frame start signal line STU is at a high level.

When the second transistor T2 is turned on, a high-level signal in the first scan control signal CN1 is provided to the first scan input signal line CN of three shift registers of the first dummy shift register, the scan dummy shift register and the second dummy shift register through the first transmission line, so that the signal of the first scan input signal line CN is at a high level. When the third transistor T3 is turned on, a low-level signal in the second scan control signal CNB1 is provided to the second scan input signal line CNB of the three shift registers of the first dummy shift register, the scan dummy shift register and the second dummy shift register through the second transmission line, so that the signal of the second scan input signal line CNB is at a low level.

When the frame start signal line STU is at a high level, the seventh transistor T7 is turned on, and the signal of the first scan input signal line CN is at a high level. Thus, the pull-up node Q2 of the first dummy shift register is written with a high-level signal.

In the first dummy shift register, since the pull-up node Q2 of the first dummy shift register is a high-level signal, at this time, the twenty-third transistor T23 and the twenty-fifth transistor T25 are both turned on. Since the frame start signal line STU provides a high-level signal, at this time, the twenty-first transistor T21 is turned on. A low-level signal provided by the second scan input signal line CNB is written into the pull-down node QB2. At this time, the twenty-fourth transistor T24 and the twenty-sixth transistor T26 are both turned off. A low-level signal of the cascade clock signal line CLKD_2 of the first dummy shift register is written into the cascade output signal line CR<N> through the twenty-third transistor T23 turned on. The cascade output signal line CR<N> outputs a low-level signal. A low-level signal of the clock signal line CLKE_2 of the first dummy shift register is written into the drive output end OUT2<N> through the twenty-fifth transistor T25 turned on. The drive output end OUT2<N> of the first dummy shift register outputs a low-level signal.

In the scan shift register, since the cascade output signal line of the first dummy shift register provides a low-level signal, the fourth transistor T4 and the twelfth transistor T12 are turned off. The frame start signal line STU is a high-level signal, therefore, the sixth transistor T6 is turned on. A low-level signal of the first reference signal line VGL1 is written into the pull-up node Q1 of the scan shift register through turned-on sixth transistor T6. Therefore, the fourteenth transistor T14 and the sixteenth transistor T16 are turned off. At this time, the VDD signal in the power supply signal line is written to the pull-down node QB1 through turned-on eleventh transistor T11, that is, the pull-down node DB1 is written with a high-level signal. At this time, the fifteenth transistor T15 and the seventeenth transistor T17 are turned on. The low-level signal of the first reference signal line VGL1 is written into the cascade signal output end cr<n> through the fifteenth transistor T15. The cascade signal output end cr<n> outputs a low-level signal. The low-level signal of the second reference signal line VGL2 is written into the drive output end OUT1<N> through the seventeenth transistor T17. The drive output end OUT1<N> of the scan shift register outputs a low-level signal.

In the second dummy shift register, since the cascade signal output end cr<n> of the scan shift register provides a low-level signal, the seventh transistor T7' and the twenty-first transistor T21' are turned off. Since the frame start signal line STU is at a high level, the eighth transistor T8' and the twenty-second transistor T22' are turned on. At this time, the low-level signal of the second scan input signal line CNB is written into the pull-up node Q3 through the eighth transistor T8'. A high-level signal of the first scan input signal line CN is written into the pull-down node QB3 through the twenty-second transistor T22'. At this time, the twenty-third transistor T23' and the twenty-fifth transistor T25' are turned off, and the twenty fourth transistor T24' and the twenty sixth transistor T26' are turned on. The cascade output signal line CR<N> and the drive output end OUT3<N> of the second dummy shift register both output low-level signals.

In a stage of time t2, the first control signal line A1 in the level control unit 10 provides an inactive-level signal, that is, the first transistor T1 is turned off. The second control signal line A2 provides an active-level signal, that is, the second transistor T2 is turned on. The third control signal line A3 provides an active-level signal, that is, the third transistor T3 is turned on. The cascade clock signal line CLKD_2 in the first dummy shift register is at a high level, the clock signal line CLKE_2 is at a high level, the first reference signal line VGL1 is at a low level, the second reference signal line VGL2 is at a low level, and the frame start signal line STU is at a low level.

When the second transistor T2 is turned on, a high-level signal in the first scan control signal CN1 is provided to the first scan input signal line CN of three shift registers of the first dummy shift register, the scan dummy shift register and the second dummy shift register through the first transmission line, so that the signal of the first scan input signal line CN is at a high level. When the third transistor T3 is turned on, a low-level signal in the second scan control signal CNB1 is provided to the second scan input signal line CNB of the three shift registers of the first dummy shift register, the scan dummy shift register and the second dummy shift register through the second transmission line, so that the signal of the second scan input signal line CNB is at a low level.

After a signal in the cascade clock signal line CLKD_2 and a signal in the clock signal line CLKE_2 jump from a low level to a high level, due to a bootstrap effect of the second capacitor c2, a voltage of the pull-up node Q2 of the first dummy shift register is further raised, the twenty-third transistor T23 and the twenty-fifth transistor T25 are fully turned on. A high level of the pull-up node Q2 of the first dummy shift register controls the eighteenth transistor T18 to be turned on. A low level of the first reference signal line VGL1 is written into the pull-down node QB2 of the first dummy shift register through turned-on eighteenth transistor T18. A high level of the clock signal line CLKE_2 is written to the drive output end OUT2<N>. That is, the drive output end OUT2<N> outputs a high-level signal. A high level of the cascade clock signal line CLKD_2 is written into the cascade output signal line CR<N> through the twenty-third transistor T23. That is, the cascade output signal line CR<N> outputs a high-level signal.

At the same time, since the cascade output signal line CR<N> of the first dummy shift register outputs a high-level signal, a high-level signal in the cascade output signal line CR<N> is provide to a first input signal line CR<N−1> of the scan shift register, to turn on the fourth transistor T4 in the scan shift register. The high-level signal of the first scan input signal line CN is written into the pull-up node Q1 in the scan shift register through the turned-on fourth transistor T4. The fourteenth transistor T14 and that sixteenth transistor T16 are turned on. At the same time, since the high-level signal in the cascade output signal line CR<N> of the first dummy shift register causes the transistor T12 in the scan shift register to be turned on, and the low-level signal of the second scan input line CNB causes the pull-down node QB1 of the scan shift register to be at a low level, the tenth transistor T10, the fifteenth transistor T15, and the seventeenth transistor T17 are all turned off.

Meanwhile, since the cascade output signal line CR<N> of the first dummy shift register outputs a high-level signal, the twelfth transistor T12 is turned on. A low-level signal in the second scan input signal line CNB is written into the pull-down node QB1 in the scan shift register through turned-on twelfth transistor T12.

At this time, in the second dummy shift register, since the cascade signal output end cr<n> of the scan shift register outputs a low-level signal, at this time, the seventh transistor T7' and the twenty-first transistor T21' in the second dummy shift register are both turned off.

In a stage of time t3, the first control signal line A1 in the level control unit 10 provides an inactive-level signal, that is, the first transistor T1 is turned off. The second control signal line A2 provides an active-level signal, that is, the second transistor T2 is turned on. The third control signal line A3 provides an active-level signal, that is, the third transistor T3 is turned on. The cascade clock signal line CLKD_1 in the scan shift register is at a high level, the clock signal line CLKE_1 is at a high level, the first reference signal line VGL1 is at a low level, the second reference signal line VGL2 is at a low level, and the frame start signal line STU is at a low level.

When the second transistor T2 is turned on, a high-level signal in the first scan control signal CN1 is provided to the first scan input signal line CN of three shift registers of the first dummy shift register, the scan dummy shift register and the second dummy shift register through the first transmission line, so that the signal of the first scan input signal line CN is at a high level. When the third transistor T3 is turned on, a low-level signal in the second scan control signal CNB1 is provided to the second scan input signal line CNB of the three shift registers of the first dummy shift register, the scan dummy shift register and the second dummy shift register through the second transmission line, so that the signal of the second scan input signal line CNB is at a low level.

At this time, in the first dummy shift register, since the cascade clock signal line CLKD_1 and the clock signal line CLKE_1 in the first dummy shift register jump from a high level to a low level, at this time, both the cascade output end CR<N> and the drive output end OUT2<N> in the first dummy shift register output low-level signals. In the scan shift register, the fourth transistor T4 and the twelfth transistor T12 are turned off under control of the low-level signal of the cascade output end CR<N> in the first dummy shift register.

After the cascade clock signal line CLKD_2 and the clock signal line CLKD_2 in the shift register jump from a low level to a high level, due to the bootstrap effect of the first capacitor c1, the voltage of the pull-up node Q1 of the scan shift register is further raised, and the fourteenth transistor T14 and the sixteenth transistor T16 are fully turned on. A high level of the pull-up node Q1 of the scan shift register controls the ninth transistor T9 to be turned on. The low level of the first reference signal line VGL1 is written into the pull-down node QB1 of the scan shift register. The high level of the clock signal line CLKE_1 is output through the sixteenth transistor T16, that is, the drive output end OUT1<N> outputs a high-level signal. That is, the drive output end OUT1<N> of the scan shift register provides a high-level signal for the gate line. The high level of the cascade clock signal line CLKD_1 is output through fourteenth transistor T14, that is, the cascade output signal line CR<N> outputs a high-level signal.

Meanwhile, since the signal in the cascade output signal line of the scan shift register is at a high level, a high-level signal in that cascade output signal line CR<N> is provided to the first input signal line of the second dummy shift register, to turn on the seventh transistor T7' in the second dummy shift register. The high-level signal in the first scan input signal line CN is written into the pull-up node Q3 in the second dummy shift register through turned-on seventh transistor T7', and the twenty-third transistor T23' and the twenty-fifth transistor T25' are turned on.

At this time, the cascade output signal line CR<N> and the drive output end OUT3<N> of the second dummy shift register both output low-level signals. Correspondingly, the fifth transistor T5 and the thirteenth transistor T13 in the scan shift register are turned off.

Meanwhile, since the signal in the cascade output signal line of the scan shift register is at a high level, a high-level signal in the cascade output signal line CR<N> is provided to the second input signal line of the first dummy shift register, to turn on the eighth transistor T8 of the first dummy shift register. The low-level signal of the second scan input signal is written into the pull-up node of the first dummy shift register. Since the signal in the cascade output signal line of the scan shift register is at a high level, a high-level signal in the cascade output signal line CR<N> is provided to the twenty-second transistor T22 of the first dummy shift register, so that the twenty-second transistor T22 is turned on. A high-level signal of the first scan input signal is provided to the pull-down node of the first dummy shift register through the turned-on twenty-second transistor T22, to turn on the twenty-fourth transistor T24. The low-level signal of the first reference signal line VGL1 is written into the cascade signal output end of the first dummy shift register through the turned-on twenty-fourth transistor T24, for realizing resetting of the cascade signal output end. The high-level signal of the pull-down node is also provided to the twenty-sixth transistor T26, and the twenty-sixth transistor T26 is turned on. A low-level signal of the second reference signal line VGL2 is written into the drive output end of the first dummy shift register through the turned-on twenty-sixth transistor T26, and the drive output end outputs a low-level signal. The high-level signal at the pull-down node is also provided to the nineteenth transistor T19, and the nineteenth transistor T19 is turned on. A low-level signal of the first reference signal line VGL1 is written into the pull-up node of the first dummy shift register through the turned-on nineteenth transistor T19, to reset the pull-up node.

Meanwhile, since the signal in the cascade output signal line of the scan shift register is at a high level, a high-level signal in the cascade output signal line CR<N> is provided to the twenty-first transistor T21' of the second dummy shift register, and the twenty-first transistor T21' is turned on. A low-level signal of the second scan input signal is written into the pull-down node of the second dummy shift register through the turned-on twenty-first transistor T21'.

In a stage of time t4, the first control signal line A1 in the level control unit 10 provides an inactive-level signal, that is, the first transistor T1 is turned off. The second control signal line A2 provides an active-level signal, that is, the second transistor T2 is turned on. The third control signal line A3 provides an active-level signal, that is, the third transistor T3 is turned on. The cascade clock signal line CLKD_3 in the shift register unit 20 is at a high level, the clock signal line CLKE_3 is at a high level, the first reference signal line VGL1 is at a low level, the second reference signal line VGL2 is at a low level, and the frame start signal line STU is at a low level.

When the second transistor T2 is turned on, a high-level signal in the first scan control signal CN1 is provided to the first scan input signal line CN of three shift registers of the first dummy shift register, the scan dummy shift register and the second dummy shift register through the first transmission line, so that the signal of the first scan input signal line CN is at a high level. When the third transistor T3 is turned on, a low-level signal in the second scan control signal CNB1 is provided to the second scan input signal line CNB of the three shift registers of the first dummy shift register, the scan dummy shift register and the second dummy shift register through the second transmission line, so that the signal of the second scan input signal line CNB is at a low level.

In the scan shift register, since the cascade clock signal line CLKD_1 and the clock signal line CLKE_1 jump from a high level to a low level, at this time, the cascade output end CR<N> and the drive output end OUT1<N> in the scan shift register both output low-level signals.

In the first dummy shift register, the eighth transistor T8 and the twenty-second transistor T22 are turned off under the control of the low-level signal of the cascade output end CR<N> in the scan shift register.

In the second dummy shift register, the seventh transistor T7' and the twenty-first transistor T21' are turned off under the control of low-level signal of the cascade output end CR<N> in the scan shift register.

After the cascade clock signal line CLKD_3 and the clock signal line CLKE_3 of the second dummy shift register jump from the low level to the high level, due to the bootstrap effect of the third capacitor c3, the voltage of the pull-up node Q3 of the second dummy shift register is further raised, and the twenty-third transistor T23' and the twenty-fifth transistor T25' are fully turned on. A high level of the pull-up node Q3 of the second dummy shift register controls the eighteenth transistor T18' of the second dummy shift register to be turned on. The low level of the first reference signal line VGL1 is written into the pull-down node Q3 of the second dummy shift register. The high level of the clock signal line CLKE_3 is written into the drive output end OUT3<N>. That is, the drive output end OUT3<N> outputs a high-level signal. The high level of the cascade clock signal line CLKD_3 is written into the cascade output signal line CR<N> through the twenty-third transistor T23'. That is, the cascade signal output end CR<N> outputs a high-level signal.

Meanwhile, since the signal in the cascade output signal line CR<N> of the second dummy shift register is at a high level, a high-level signal in the cascade output signal line CR<N> is provided to a second input signal line of the scan shift register, to turn on the fifth transistor T5 of the scan shift register. The low-level signal of the second scan input signal line CNB in the scan shift register is written into the pull-up node Q1 of the scan shift register. Since the signal in the cascade output signal line CR<N> of the second dummy shift register is high, a high-level signal in the cascade output signal line CR<N> is provided to the thirteenth transistor T13 of the scan shift register, so that the thirteenth transistor t13 is turned on. A high-level signal of the first scan input signal line CN is provided to the pull-down node QB1 of the scan shift register through turned-on thirteenth transistor T13, so that the fifteenth transistor T15 of the scan shift register is turned on. A low-level signal of the first reference signal line VGL1 is written into the cascade signal output end cr<n> of the scan shift register through the turned-on fifteenth transistor T15, to realize resetting of the cascade signal output end.

Meanwhile, the high-level signal of the pull-down node QB1 of the scan shift register is also provided to the tenth transistor T10 of the scan shift register, and the tenth transistor T10 is turned on. A low-level signal on the first reference signal line VGL1 is written to the pull-up node Q1 of the scan shift register through the turned-on tenth transistor T10.

In a stage of time t5, the first control signal line A1 in the level control unit 10 provides an active-level signal, that is, the first transistor T1 is turned on. The second control signal line A2 provides an inactive-level signal, that is, the second transistor T2 is turned off. The third control signal line A3 provides an active-level signal, that is, the third transistor T3 is turned on. The cascade clock signal line CLKD_2 in the shift register unit 20 is at a low level, the clock signal line CLKE_2 is at a low level, the first reference signal line VGL1 is at a low level, the second reference signal line VGL2 is at a low level, and the frame start signal line STU is at a high level. The cascade output signal line CR<N> of the first dummy shift register is at a low level, and the cascade signal output end OUT1 of the scan shift register is at a low level.

First, it should be added that after display of one frame of the display panel is completed, the signal in the frame start signal line STU is again set to a high level.

When the third transistor T3 is turned on, a low-level signal in the second scan control signal CNB1 is provided to the second scan input signal line CNB of the three shift registers of the first dummy shift register, the scan dummy shift register and the second dummy shift register through the second transmission line, so that the signal of the second scan input signal line CNB is at a low level. When the first transistor T1 is turned on, the first transmission line and the second transmission line are connected. The low-level signal in the second scan control signal CNB1 is transmitted to the first transmission line through the second transmission line, and the first transmission line provides the low-level signal to the first scan input signal line CN of three shift registers of the first dummy shift register, the scan dummy shift register and the second dummy shift register through the second transmission line, so that the signal of the first scan input signal line CN is also at a low level.

When the signal of the frame start signal line STU is at a high-level, the second input signal line of the second dummy shift register is a high-level signal, and the eighth transistor T8' is turned on. The low-level signal of the second scan input signal line CNB is written into the pull-up node of the second dummy shift register through turned-on eighth transistor T8'. Meanwhile, when the signal of the frame start signal line STU is at a high level, the twenty-second transistor T22' of the second dummy shift register is turned on. A low-level signal of the first scan input signal line CN is written into the pull-down node Q3 of the second dummy shift register through turned-on twenty-second transistor T22'. However, the high-level signal of the power supply signal line VDD turns on the twenty-fourth transistor T24' and the twenty-sixth transistor T26'. The low-level signal of the first reference signal line VGL1 is written into the cascade signal output end of the second dummy shift register through the turned-on twenty-fourth transistor T24', to reset the cascade signal output end of the second dummy shift register. The low-level signal of the second reference signal line VGL2 is provided to the drive output end OUT3<N> of the second dummy shift register through turned-on twenty-sixth transistor T26', to reset the drive output end OUT3<N> of the second dummy shift register.

In addition, after a frame of image is scanned using the three shift registers of the first dummy shift register, and before the next frame is scanned, the gate driving circuit needs to be reset.

In a frame reset process, in the first dummy shift register, a high-level signal of the frame start signal line STU turns on the seventh transistor T7 of the third input module 201 of the first dummy shift register. The low-level signal of the first scan input signal line CN is provided to the pull-up node Q of the first dummy shift register through turned-on seventh transistor T72 to perform a frame reset.

In a frame reset process, in the scan shift register, the high-level signal of the frame start signal line STU turns on the sixth transistor T6 of the frame reset module of the scan shift register. The low-level signal of the first reference signal line VGL1 is provided to the pull-up node Q1 of the scan shift register through turned-on sixth transistor T6 to perform a frame reset.

In a frame reset process, in the second dummy shift register, a high-level signal of the frame start signal line STU turns on the eighth transistor T8' of the fourth input module 202 of the second dummy shift register. The low-level signal of the second scan input signal line CNB is provided to the pull-up node Q3 of the second dummy shift register through the turned-on eighth transistor T8 to perform a frame reset.

Figure 12:
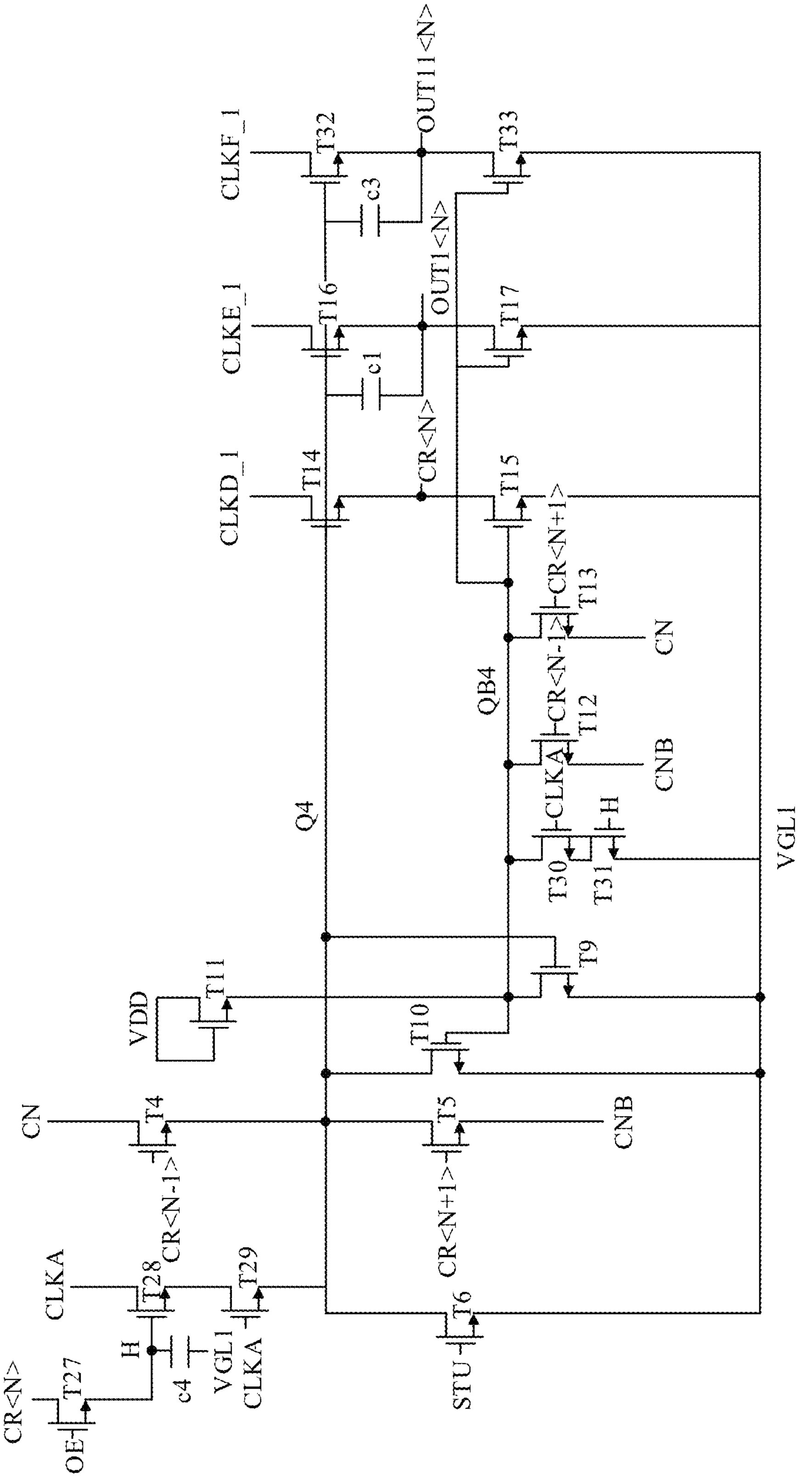
FIG. 12 is a circuit electrical connection schematic diagram of another scan shift register unit in an embodiment of the present disclosure.
Figure 13:
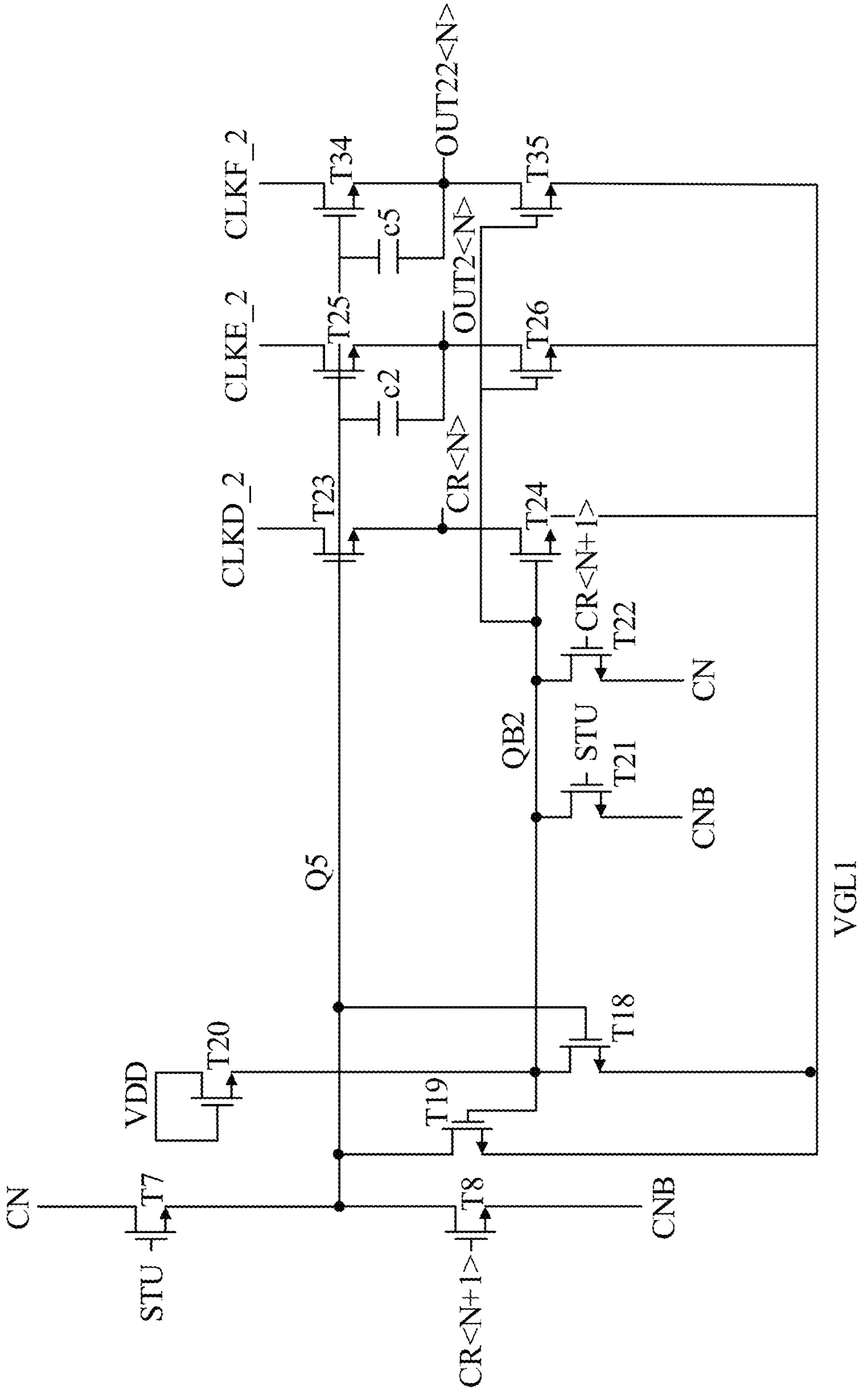
FIG. 13 is a circuit electrical connection schematic diagram of another first dummy shift register in related art.
Figure 14:
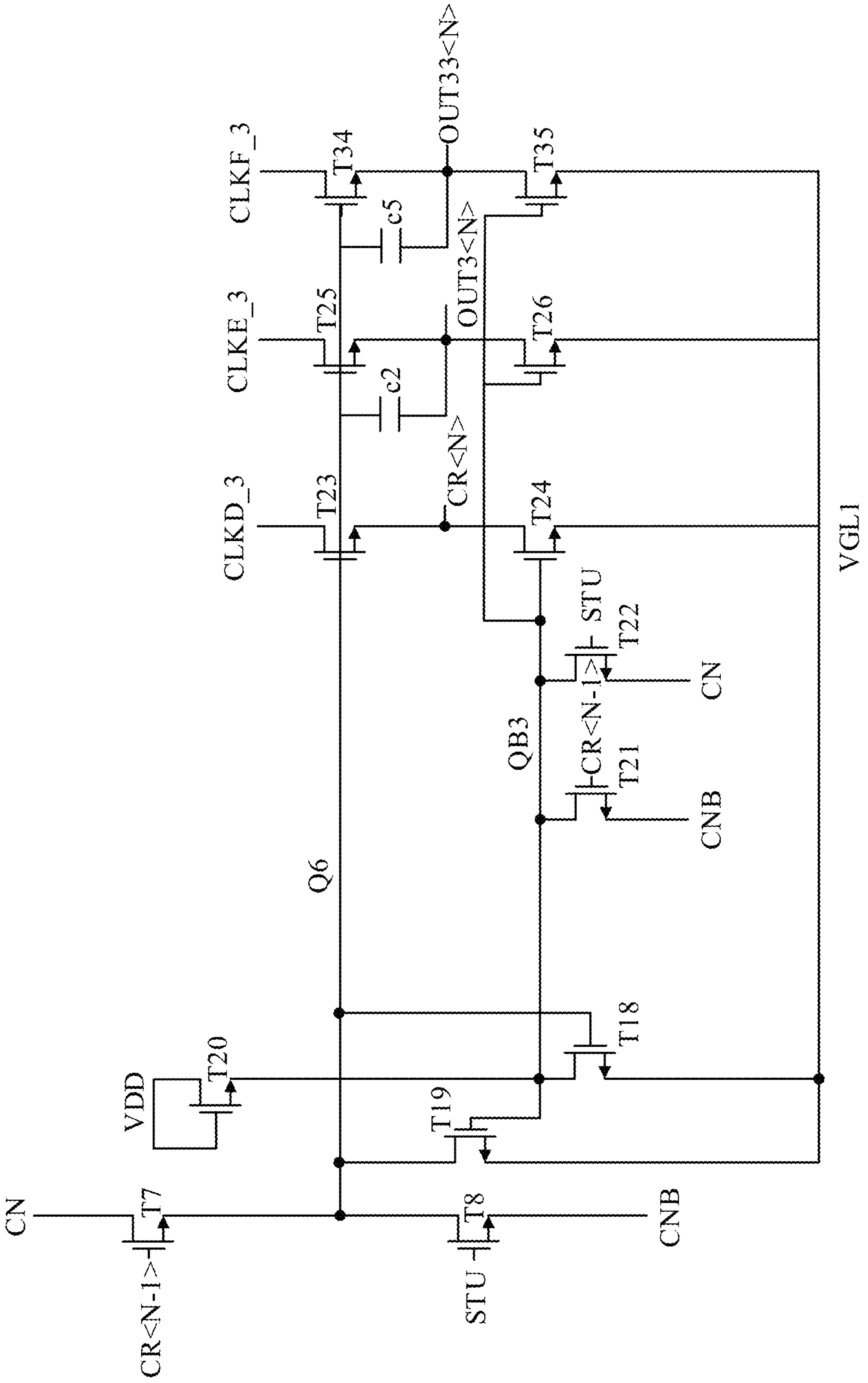
FIG. 14 is a circuit electrical connection schematic diagram of another second dummy shift register according to an embodiment of the present disclosure.

In addition, it should be noted that, the above-described process of frame reset using the frame start signal line STU can also be applied to a circuit shown in FIG. 12. Here, the frame reset process is similar to that shown in FIGS. 7, 9 and 10, and will not be described again.

In addition, as shown in FIG. 12, the pull-up node Q4 may leak current due to the negative bias. The scan shift register in embodiments of the present disclosure further includes a compensation module. The compensation module is configured to provide a high-level compensation signal to the pull-up node Q4 in response to a signal of a compensation signal line OE.

The compensation module includes a twenty-seventh transistor T27, a twenty-eighth transistor T28, a twenty-ninth transistor T29, and a fourth capacitor c4. A control end of the twenty-seventh transistor T27 is electrically connected with the compensation signal line OE, a first end of the twenty-seventh transistor T27 is electrically connected with the cascade signal output end cr<n>, and a second end of the twenty-seventh transistor T27 is electrically connected with a control end of the twenty-eighth transistor T28. A first end of the twenty-eighth transistor T28 is electrically connected with a compensation clock signal line CLKA, and a second end of the twenty-eighth transistor T28 is electrically connected with a first end of the twenty-ninth transistor T29. A control end of the twenty-ninth transistor T29 is electrically connected with the compensation clock signal line CLKA, and a second end of the twenty-ninth transistor T29 is electrically connected with the pull-up node Q4. A first end of the fourth capacitor c4 is electrically connected with the control end of the twenty-eighth transistor T28, and a second end of the fourth capacitor c4 is electrically connected with the first reference signal line VGL1.

In an implementation process, a waveform of the compensation signal line OE is consistent with a waveform of the cascade signal output end cr<n>. When the cascade signal output end cr<n> outputs a high-level signal, the compensation signal line OE is also a high-level signal, and the twenty-seventh transistor T27 is turned on. A high-level signal of the cascade signal output end cr<n> is provided to the control end of the twenty-eighth transistor T28 through the twenty-seventh transistor T27 turned on, and the twenty-eighth transistor T28 is turned on. The high-level signal of the compensation clock signal line CLKA is provided to the control end of the twenty-ninth transistor T29, and the twenty-ninth transistor T29 is turned on. A high-level signal of the compensation clock signal line CLKA is provided to the pull-up node Q4 through the twenty-eighth transistor T28 and the twenty-ninth transistor T29 turned on, to compensate the level of the pull-up node Q4. The fourth capacitor c4 is for maintaining a potential of the control end of the twenty-eighth transistor T28. In a display phase of a frame of image, the control end of the twenty-eighth transistor T28 is written with a high potential through the twenty-seventh transistor T27. The high level of the control end of the twenty-eighth transistor T28 is maintained until the end of display of the frame of image (i.e., a blank region). The pull-up node Q4 in the blank region is written with a high potential through the twenty-eighth transistor T28 and the twenty-ninth transistor T29.

In addition, the scan shift register further includes an auxiliary compensation module. The auxiliary compensation module can pull down a pull-down node QB4 when the pull-up node Q4 is written with a high potential. The auxiliary compensation module includes a thirtieth transistor T30 and a thirty-first transistor T31.

A control end of the thirtieth transistor T30 is electrically connected with the compensation clock signal line CLKA, a first end of the thirtieth transistor T30 is electrically connected with the pull-down node QB4, and a second end of the thirtieth transistor T30 is electrically connected with a first end of the thirty-first transistor T31. A control end of the thirty-first transistor t31 is electrically connected with the control end of the twenty-eighth transistor T28, and a second end of the thirty-first transistor T31 is electrically connected with the first reference signal line VGL1.

In an implementation process, when the compensation clock signal line CLKA is at a high potential, the thirtieth transistor T30 is turned on. When the control end of the twenty-eighth transistor T28 is at a high potential, the thirtieth transistor T31 is turned on. A low potential of the first reference signal line VGL1 is written into the pull-down node QB4 through the thirtieth transistor T30 and the thirtieth transistor T31 turned on, so that the pull-down node QB4 is at a low potential.

Based on the same inventive concept, embodiments of the present disclosure provide a display panel including a plurality of gate lines and the above gate driving circuit.

A drive output end of one scan shift register in the gate driving circuit is electrically connected with one gate line of the plurality of gate lines.

Based on the same inventive concept, embodiments of the present disclosure provide a display apparatus including the display panel described above.

The display apparatus according to embodiments of the present disclosure may be any product or component with display function such as a tablet computer, a television, a display, a notebook computer, a digital photo frame, a navigator. Other essential components of the display apparatus are as will be understood by those skilled in the art. This description is not intended to be exhaustive and should not be construed as limiting the present disclosure.

Figure 15:
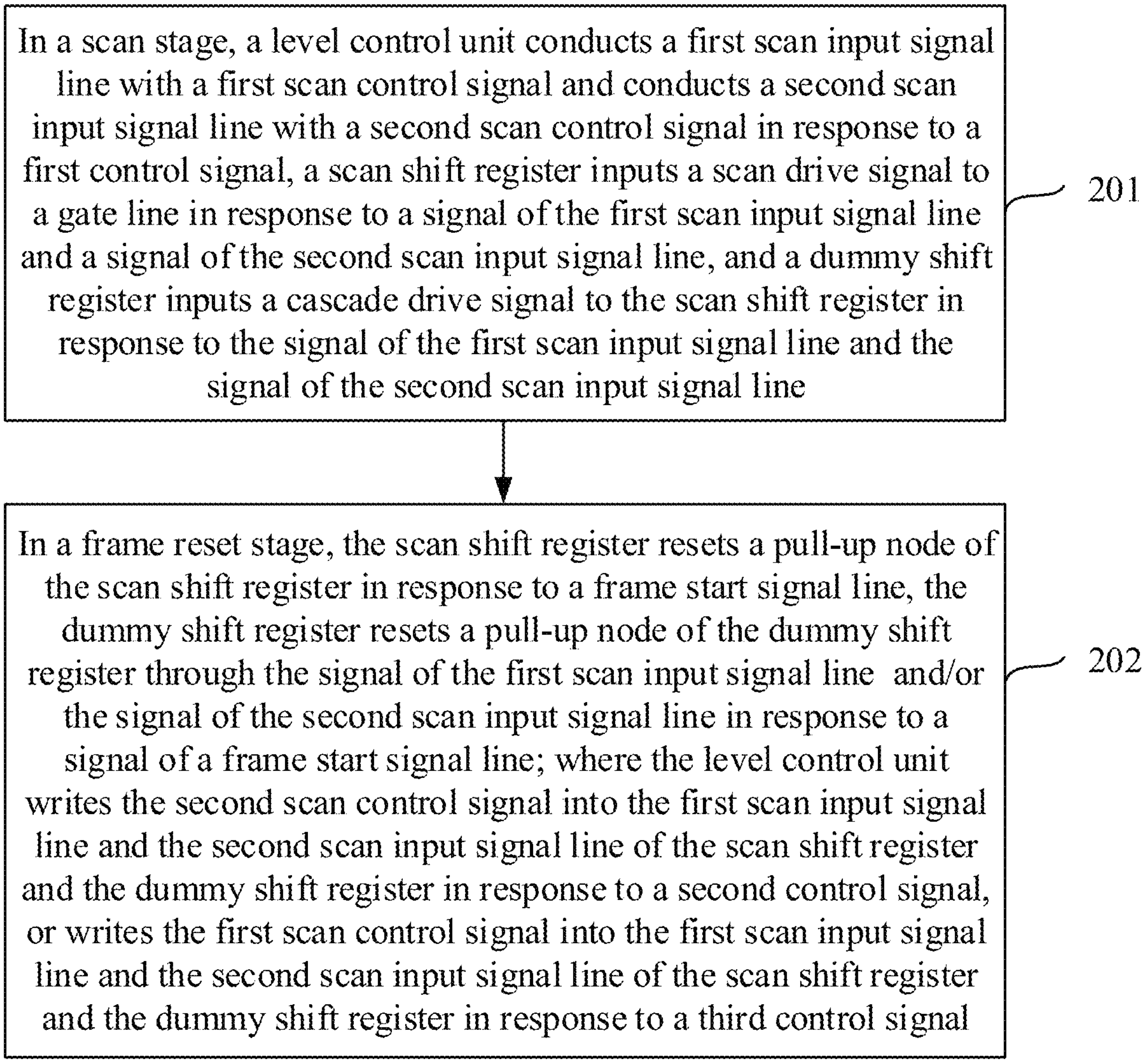
FIG. 15 is a flowchart of a method for driving a gate driving circuit according to an embodiment of the present disclosure.

Based on the same inventive concept, embodiments of the present disclosure provide a driving method for the above gate driving circuit. As shown in FIG. 15, the driving method includes following steps.

Step 201: in a scan stage, the level control unit 10 writes the first scan control signal CN1 into the first scan input signal line CN and writes the second scan control signal CNB1 into the second scan input signal line CNB in response to the first control signal, the scan shift register inputs the scan drive signal to the gate line in response to the signal of the first scan input signal line CN and the signal of the second scan input signal line CNB, and the dummy shift register inputs the cascade drive signal to the scan shift register in response to the signal of the first scan input signal line CN and the signal of the second scan input signal line CNB.

In an implementation process, the level control unit 10 and the shift register unit 20 are used cooperatively. The above level control unit 10 mainly provides the first scan control signal and the second scan control signal of different levels to the shift register unit 20 during forward scanning, backward scanning and frame reset, so that the shift register unit 20 operates according to the first scan input signal and the second scan input signal in the forward scanning, the backward scanning, and the frame reset process after removal of the original transistors for the frame reset.

In a process of forward scanning, under control of the first control signal, the level control unit 10 writes the first scan control signal CN1 into the first scan input signal line CN, and writes the second scan control signal CNB1 into the second scan input signal line CNB, to provide a high-level signal to the first scan input signal line CN of the scan shift register and the dummy shift register in the shift register unit 20 is provided with, and provide a low-level signal to the second scan input signal line CNB of the scan shift register and the dummy shift register in the shift register unit 20. Under control of the first scan input signal and the second scan input signal, the dummy shift register inputs a cascade drive signal to the scan shift register. Under control of the first scan input signal, the second scan input signal and the cascade drive signal, the scan shift register inputs a scan drive signal to that gate line.

In a process of backward scanning, under control of the first control signal, the level control unit 10 writes the first scan control signal CN1 into the first scan input signal line CN, and writes the second scan control signal CNB1 into the second scan input signal line CNB, to provide a low-level signal to the first scan input signal line CN of the scan shift register and the dummy shift register in the shift register unit 20 is provided with, and provide a high-level signal to the second scan input signal line CNB of the scan shift register and the dummy shift register in the shift register unit 20. Under control of the first scan input signal and the second scan input signal, the dummy shift register inputs a cascade drive signal to the scan shift register. Under control of the first scan input signal, the second scan input signal and the cascade drive signal, the scan shift register inputs a scan drive signal to that gate line.

Step 202: in a frame reset stage, the scan shift register resets a pull-up node of the scan shift register in response to a frame start signal line STU, the dummy shift register resets a pull-up node of the dummy shift register through the signal of the first scan input signal line CN and/or the signal of the second scan input signal line CNB in response to a signal of a frame start signal line STU; where the level control unit 10 writes the second scan control signal CNB1 into the first scan input signal line CN and the second scan input signal line CNB of the scan shift register and the dummy shift register in response to the second control signal, or writes the first scan control signal CN1 into the first scan input signal line CN and the second scan input signal line CNB of the scan shift register and the dummy shift register in response to the third control signal.

In embodiments of the present disclosure, as the transistors originally used for frame reset are removed, after a frame of image is display and before a next frame of image is started, the level control unit 10 and the shift register unit 20 need to cooperate to complete the frame reset operation.

In a specific implementation process, after the forward scanning is finished, the level control unit 10 writes the second scan control signal CNB1 into the first scan input signal line CN and the second scan input signal line CNB of the scan shift register and the dummy shift register in response to the second control signal. That is, after the end of the forward scanning, the first scan input signal line CN and the second scan input signal line CNB of the scan shift register and the dummy shift register are both input with a low-level signal. The scan shift register resets a pull-up node of the scan shift register with the sixth transistor T6 in response to the start of frame signal line STU. The dummy shift register resets a pull-up node of the dummy shift register through the signal of the first scan input signal line CN and/or the signal of the second scan input signal line CNB in response to the signal of the frame start signal line STU. That is, the first dummy shift register resets the pull-up node thereof with the seventh transistor T7 through the signal of the first scan input signal line CN in response to the signal of the frame start signal line STU. The second dummy shift register resets the pull-up node thereof with the eighth transistor T8 through the signal of the second scan input signal line CNB in response to the signal of the frame start signal line STU.

In a specific implementation process, after the backward scanning is finished, the level control unit 10 writes the first scan control signal CN1 into the first scan input signal line CN and the second scan input signal line CNB of the scan shift register and the dummy shift register in response to the third control signal. That is, after the end of the backward scanning, the first scan input signal line CN and the second scan input signal line CNB of the scan shift register and the dummy shift register are both input with a low-level signal. The scan shift register resets a pull-up node of the scan shift register with the sixth transistor T6 in response to the start of frame signal line STU. The dummy shift register resets a pull-up node of the dummy shift register through the signal of the first scan input signal line CN and/or the signal of the second scan input signal line CNB in response to the signal of the frame start signal line STU. That is, the first dummy shift register resets the pull-up node thereof with the seventh transistor T7 through the signal of the second scan input signal line CNB in response to the signal of the frame start signal line STU. The second dummy shift register resets the pull-up node thereof with the eighth transistor T8 through the signal of the first scan input signal line CN in response to the signal of the frame start signal line STU.

In summary, embodiments of the present disclosure provide a gate driving circuit, a display panel, and a display apparatus. The gate driving circuit includes a shift register unit and a level control unit. The shift register unit includes a scan shift register and a dummy shift register. The scan shift register is electrically connected with a gate line, and is configured to input a scan drive signal to the gate line according to a signal of a first scan input signal line and a signal of a second scan input signal line. The dummy shift register is electrically connected with the scan shift register, and is configured to input a cascade drive signal to the scan shift register according to the signal of the first scan input signal line and the signal of the second scan input signal line. The level control unit is electrically connected with the first scan input signal line and the second scan input signal line of the scan shift register and the dummy shift register respectively, and is configured to write a first scan control signal into the first scan input signal line of the scan shift register and the dummy shift register and write a second scan control signal into the second scan input signal line of the scan shift register and the dummy shift register in response to a first control signal, write the second scan control signal into the first scan input signal line and the second scan input signal line of the scan shift register and the dummy shift register in response to a second control signal, and write the first scan control signal into the first scan input signal line and the second scan input signal line of the scan shift register and the dummy shift register in response to a third control signal. After transistors for frame reset in the scan shift register and the dummy shift register are removed, frame reset processing is performed on the scan shift register and the dummy shift register in combination with different conduction conditions of the level control unit, to reduce the number of transistors in the gate driving circuit, save the cost and improve the yield of the panel.

Those skilled in the art should understand that embodiments of the present application can be provided as methods, systems or computer program products. Therefore, the present application can adopt forms of full hardware embodiments, full software embodiments, or embodiments combining software and hardware aspects. Moreover, the present application can adopt a form of the computer program products implemented on one or more computer available storage mediums (including but not limited to a disk memory, a CD-ROM, an optical memory and the like) containing computer available program codes.

The present application is described with reference to flow charts and/or block diagrams of the methods, the equipment (systems), and the computer program products according to embodiments of the present application. It should be understood that each flow and/or block in the flow charts and/or the block diagrams and combinations of the flows and/or the blocks in the flow charts and/or the block diagrams can be implemented by computer program instructions. The computer program instructions may be provided to a processor of a general-purpose computer, a special-purpose computer, an embedded processing machine or other programmable data processing equipment, thereby generating a machine, such that the instructions, when executed by the processor of the computers or other programmable data processing equipment, generate devices for implementing functions specified in one or more flows in the flow charts and/or one or more blocks in the block diagrams.

The computer program instructions may also be stored in a computer readable memory which can guide the computers or other programmable data processing equipment to work in a specific mode, thus the instructions stored in the computer readable memory generates an article of manufacture that includes a commander device that implement the functions specified in one or more flows in the flow charts and/or one or more blocks in the block diagrams.

The computer program instructions may also be loaded to the computers or other programmable data processing equipment, so that a series of operating steps may be executed on the computers or other programmable equipment to generate computer-implemented processing, such that the instructions executed on the computers or other programmable equipment provide steps for implementing the functions specified in one or more flows in the flow charts and/or one or more blocks in the block diagrams.

Obviously, those skilled in the art can make various modifications and variations to the present application without departing from the spirit and scope of the present application. In this way, if these modifications and variations of the present application fall within the scope of the claims of the present application and their equivalent art, the present application also intends to include these modifications and variations.

What is claimed is:

1. A gate driving circuit, comprising: a shift register unit and a level control unit;

wherein the shift register unit comprises a scan shift register and a dummy shift register, the scan shift register is electrically connected with a gate line, and is configured to input a scan drive signal to the gate line according to a signal of a first scan input signal line and a signal of a second scan input signal line, the dummy shift register is electrically connected with the scan shift register, and is configured to input a cascade drive signal to the scan shift register according to the signal of the first scan input signal line and the signal of the second scan input signal line;

the level control unit is electrically connected with the first scan input signal line and the second scan input signal line of the scan shift register and the dummy shift register respectively, and is configured to write a first scan control signal into the first scan input signal line of the scan shift register and the dummy shift register and write a second scan control signal into the second scan input signal line of the scan shift register and the dummy shift register in response to a first control signal, write the second scan control signal into the first scan input signal line and the second scan input signal line of the scan shift register and the dummy shift register in response to a second control signal, and write the first scan control signal into the first scan input signal line and the second scan input signal line of the scan shift register and the dummy shift register in response to a third control signal.

2. The circuit according to claim 1, wherein the level control unit comprises a first control subunit, a second control subunit and a third control subunit;

a control end of the first control subunit is electrically connected with a first control signal line, a first end of the first control subunit is electrically connected with a first transmission line, and a second end of the first control subunit is electrically connected with a second transmission line;

the first control subunit is configured to conduct the first transmission line and the second transmission line in response to an active-level signal of the first control signal line;

a control end of the second control subunit is electrically connected with a second control signal line, a first end of the second control subunit is electrically connected with the first transmission line, and a second end of the second control subunit is electrically connected with a first scan control signal line;

the second control subunit is configured to write the first scan control signal into the first transmission line in response to an active-level signal of the second control signal line;

a control end of the third control subunit is electrically connected with a third control signal line, a first end of the third control subunit is electrically connected with the second transmission line, and a second end of the third control subunit is electrically connected with a second scan control signal line;

the third control subunit is configured to write the second scan control signal into the second transmission line in response to an active-level signal of the third control signal line.

3. The circuit according to claim 2, wherein the first scan input signal line of the scan shift register and the dummy shift register is electrically connected with the first transmission line, and the second scan input signal line of the scan shift register and the dummy shift register is electrically connected with the second transmission line;

the first control signal causes the first control signal line to provide an inactive-level signal, the second control signal line to provide an active-level signal, and the third control signal line to provide an active-level signal;

the second control signal causes the first control signal line to provide an active-level signal, the second control signal line to provide an inactive-level signal, and the third control signal line to provide an active-level signal;

the third control signal causes the first control signal line to provide an active-level signal, the second control signal line to provide an active-level signal, and the third control signal line to provide an inactive-level signal.

4. The circuit according to claim 2, wherein the first control subunit comprises: a first transistor, a control end of the first transistor is electrically connected with the first control signal line, a first end of the first transistor is electrically connected with the first transmission line, and a second end of the first transistor is electrically connected with the second transmission line.

5. The circuit according to claim 2, wherein the second control subunit comprises: a second transistor, a control end of the second transistor is electrically connected with the second control signal line, a first end of the second transistor is electrically connected with the first scan control signal line, and a second end of the second transistor is electrically connected with the first transmission line.

6. The circuit according to claim 2, wherein the third control subunit comprises: a third transistor, a control end of the third transistor is electrically connected with the third control signal line, a first end of the third transistor is electrically connected with the second transmission line, and a second end of the third transistor is electrically connected with the second scan control signal line.

7. The circuit according to claim 1, wherein the shift register unit comprises a plurality of scan shift registers, and the plurality of scan shift registers are arranged in cascade;

the dummy shift register comprises a first dummy shift register, a first input signal line of the first dummy shift register is electrically connected with a frame start signal line, a second input signal line of the first dummy shift register is electrically connected with a cascade signal output end of a first-level scan shift register of the plurality of scan shift registers, and a cascade output signal line of the first dummy shift register is electrically connected with a first input signal line of the first-level scan shift register.

8. The circuit according to claim 1, wherein the shift register unit comprises a plurality of scan shift registers, and the plurality of scan shift registers are arranged in cascade;

the dummy shift register comprises a second dummy shift register, a first input signal line of the second dummy shift register is connected with a cascade signal output end of a last-level scan shift register of the plurality of scan shift registers, a second input signal line of the second dummy shift register is electrically connected with a frame start signal line, and a cascade output signal line of the second dummy shift register is electrically connected with a second input signal line of the last-level scan shift register.

9. The circuit according to claim 7, wherein the scan shift register comprises:

a first input module, configured to provide the signal of the first scan input signal line to a pull-up node in response to a signal of a first input signal line;

a second input module, configured to provide the signal of the second scan input signal line to the pull-up node in response to a signal of a second input signal line;

a first node control module, configured to control a signal of the pull-up node and a signal of a pull-down node;

a first cascade output module, configured to provide a signal of a cascade clock signal line to a cascade signal output end in response to the signal of the pull-up node; or provide a signal of a first reference signal line to the cascade signal output end in response to the signal of the pull-down node;

a first drive output module, configured to provide a signal of a clock signal line to a drive output end in response to the signal of the pull-up node; or provide a signal of a second reference signal line to the drive output end in response to the signal of the pull-down node.

10. The circuit according to claim 9, wherein the first input module comprises: a fourth transistor;

a control end of the fourth transistor is electrically connected with the first input signal line, a first end of the fourth transistor is electrically connected with the first scan input signal line, and a second end of the fourth transistor is electrically connected with the pull-up node.

11. The circuit according to claim 9, wherein the second input module comprises: a fifth transistor;

a control end of the fifth transistor is electrically connected with the second input signal line, a first end of the fifth transistor is electrically connected with the pull-up node, and a second end of the fifth transistor is electrically connected with the second scan input signal line.

12. The circuit according to claim 9, the scan shift register further comprising: a frame reset module, wherein the frame reset module is electrically connected with the pull-up node;

the frame reset module is configured to provide a signal of a first reference signal line to the pull-up node in response to a signal of the frame start signal line;

wherein the frame reset module comprises: a sixth transistor;

a control end of the sixth transistor is electrically connected with the frame start signal line, a first end of the sixth transistor is electrically connected with the pull-up node, and a second end of the sixth transistor is electrically connected with the first reference signal line.

13. The circuit according to claim 7, wherein the dummy shift register comprises:

a third input module, configured to provide the signal of the first scan input signal line to a pull-up node in response to a signal of a first input signal line;

a fourth input module, configured to provide the signal of the second scan input signal line to the pull-up node in response to a signal of a second input signal line;

a second node control module, configured to control a signal of the pull-up node and a signal of a pull-down node;

a second cascade output module, configured to provide a signal of a cascade clock signal line to a cascade output signal line in response to the signal of the pull-up node; or provide a signal of a first reference signal line to the cascade output signal line in response to the signal of the pull-down node;

a second drive output module, configured to provide a signal of a clock signal line to a drive output end in response to the signal of the pull-up node; or provide a signal of a second reference signal line to the drive output end in response to the signal of the pull-down node.

14. The circuit according to claim 13, wherein the third input module comprises: a seventh transistor;

a control end of the seventh transistor is electrically connected with the first input signal line, a first end of the seventh transistor is electrically connected with the first scan input signal line, and a second end of the seventh transistor is electrically connected with the pull-up node;

wherein the fourth input module comprises: an eighth transistor;

a control end of the eighth transistor is electrically connected with the second input signal line, a first end of the eighth transistor is electrically connected with the pull-up node, and a second end of the eighth transistor is electrically connected with the second scan input signal line.

15. The circuit according to claim 12, the scan shift register further comprising a compensation module, wherein the compensation module is electrically connected with the pull-up node;

the compensation module is configured to provide a high-level compensation signal to the pull-up node in response to a signal of a compensation signal line.

16. The circuit according to claim 15, wherein the compensation module comprises a twenty-seventh transistor, a twenty-eighth transistor, a twenty-ninth transistor and a fourth capacitor;

a control end of the twenty-seventh transistor is electrically connected with the compensation signal line, a first end of the twenty-seventh transistor is electrically connected with the cascade signal output end, and a second end of the twenty-seventh transistor is electrically connected with a control end of the twenty-eighth transistor;

a first end of the twenty-eighth transistor is electrically connected with a compensation clock signal line, and a second end of the twenty-eighth transistor is electrically connected with a first end of the twenty-ninth transistor;

a control end of the twenty-ninth transistor is electrically connected with the compensation clock signal line, and a second end of the twenty-ninth transistor is electrically connected with the pull-up node;

a first end of the fourth capacitor is electrically connected with the control end of the twenty-eighth transistor, and a second end of the fourth capacitor is electrically connected with the first reference signal line.

17. The circuit according to claim 16, the scan shift register further comprising an auxiliary compensation module, wherein the auxiliary compensation module comprises a thirtieth transistor and a thirty-first transistor;

a control end of the thirtieth transistor is electrically connected with the compensation clock signal line, a first end of the thirtieth transistor is electrically connected with the pull-down node, and a second end of the thirtieth transistor is electrically connected with a first end of the thirty-first transistor;

a control end of the thirty-first transistor is electrically connected with the control end of the twenty-eighth transistor, and a second end of the thirty-first transistor is electrically connected with the first reference signal line.

18. A display panel, comprising: a plurality of gate lines and the gate driving circuit according to claim 1;

wherein a drive output end of one scan shift register in the gate driving circuit is electrically connected with one gate line of the plurality of gate lines.

19. A display apparatus, comprising: the display panel according to claim 18.

20. A driving method for the gate driving circuit according to claim 1, comprising:

in a scan stage, the level control unit writing the first scan control signal into the first scan input signal line and writing the second scan control signal into the second scan input signal line in response to the first control signal, the scan shift register inputting the scan drive signal to the gate line in response to the signal of the first scan input signal line and the signal of the second scan input signal line, and the dummy shift register inputting the cascade drive signal to the scan shift register in response to the signal of the first scan input signal line and the signal of the second scan input signal line;

in a frame reset stage, the scan shift register resetting a pull-up node of the scan shift register in response to a frame start signal line, and the dummy shift register resetting a pull-up node of the dummy shift register through the signal of the first scan input signal line and/or the signal of the second scan input signal line in response to a signal of a frame start signal line; wherein the level control unit writes the second scan control signal into the first scan input signal line and the second scan input signal line of the scan shift register and the dummy shift register in response to the second control signal, or writes the first scan control signal into the first scan input signal line and the second scan input signal line of the scan shift register and the dummy shift register in response to the third control signal.

* * * * *